(12) United States Patent
Kim et al.

(10) Patent No.: US 12,506,988 B2
(45) Date of Patent: Dec. 23, 2025

(54) DYNAMIC VISION SENSOR WITH BIAS VARIATION CIRCUIT, IMAGE SIGNAL PROCESSOR AND APPLICATION PROCESSOR

(71) Applicant: Samsung Electronics Co., Ltd., Suwon-si (KR)

(72) Inventors: Junseok Kim, Suwon-si (KR); Jiwon Im, Suwon-si (KR); Junhyuk Park, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 52 days.

(21) Appl. No.: 18/418,992

(22) Filed: Jan. 22, 2024

(65) Prior Publication Data
US 2025/0024173 A1    Jan. 16, 2025

(30) Foreign Application Priority Data

Jul. 13, 2023    (KR) .................. 10-2023-0091355

(51) Int. Cl.
| | |
|---|---|
| *H04N 25/77* | (2023.01) |
| *H04N 25/707* | (2023.01) |
| *H04N 25/709* | (2023.01) |
| *H10F 30/225* | (2025.01) |

(52) U.S. Cl.
CPC .......... *H04N 25/77* (2023.01); *H04N 25/709* (2023.01)

(58) Field of Classification Search
CPC ...... H04N 25/40; H04N 25/47; H04N 25/573; H04N 25/70; H04N 25/707; H04N 25/709; H04N 25/77; H10F 39/8033; H10F 30/225; H10F 71/135; H10F 77/959

See application file for complete search history.

(56) References Cited

U.S. PATENT DOCUMENTS

| | | | |
|---|---|---|---|
| 10,909,824 B2* | 2/2021 | Yaffe | H04N 23/56 |
| 11,825,229 B2* | 11/2023 | Brnadli | H04N 25/79 |
| 2015/0285625 A1* | 10/2015 | Deane | G01S 7/4816 |
| 2017/0237914 A1* | 8/2017 | Cho | H04N 25/709 |
| 2018/0191972 A1* | 7/2018 | Berner | H10F 39/8033 |
| 2020/0058205 A1 | 2/2020 | Yaffe et al. | |
| 2022/0224856 A1 | 7/2022 | Brändli et al. | |

FOREIGN PATENT DOCUMENTS

| | | |
|---|---|---|
| CN | 111770245 A | 10/2020 |
| CN | 114222034 A | 3/2022 |
| KR | 10-2020-0019558 A | 2/2020 |

* cited by examiner

*Primary Examiner* — Marly S Camargo
(74) *Attorney, Agent, or Firm* — Harness, Dickey & Pierce, P.L.C.

(57) ABSTRACT

Disclosed is a dynamic vision sensor. The dynamic vision sensor includes a photodiode configured to generate a first photodiode current in response to a change in light due to a movement of an object, a first transistor; a first node connected to the photodiode and the first transistor; a second node connected to the first transistor and being configured to receive a first voltage and receive a second voltage, a ground, a second transistor connected to the first node and the ground, a third node connected to the first transistor and the second transistor, and a current source connected to the third node, wherein the first voltage has a first level and the second voltage has a second level different from the first level.

20 Claims, 24 Drawing Sheets

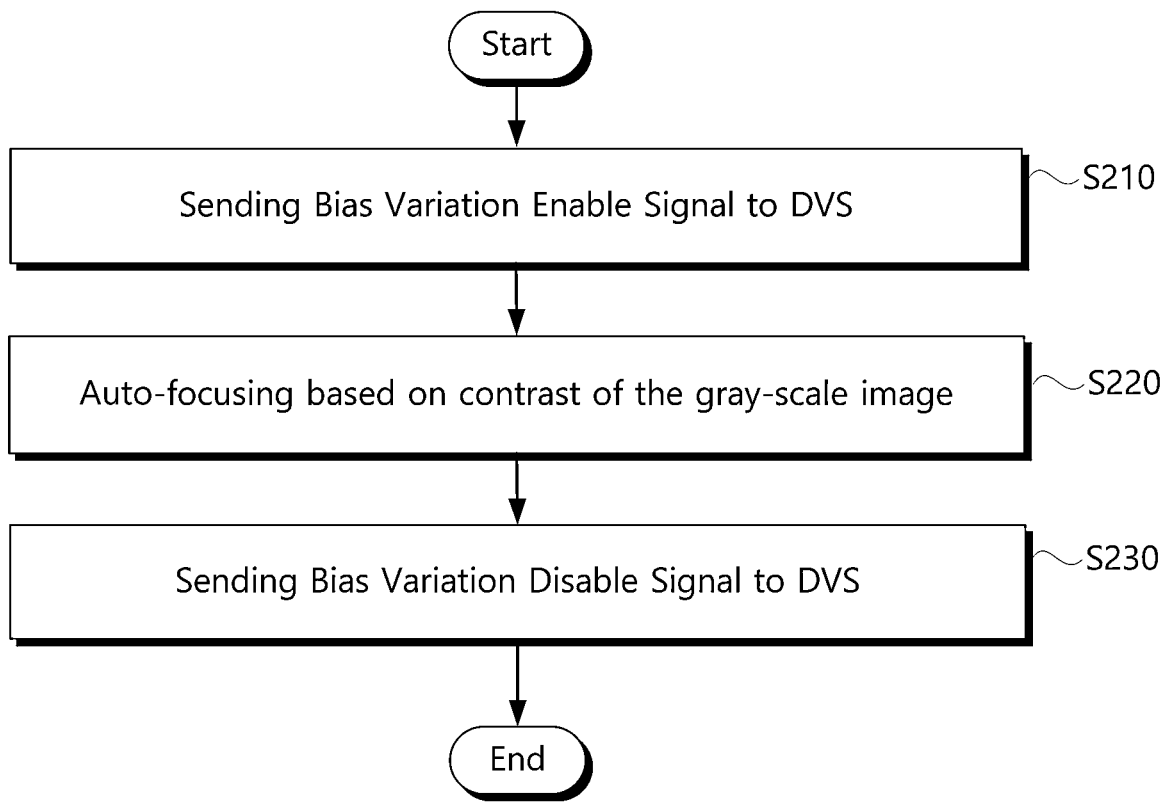

DYNAMIC VISION SENSOR WITH BIAS VARIATION CIRCUIT, IMAGE SIGNAL PROCESSOR AND APPLICATION PROCESSOR

CROSS-REFERENCE TO RELATED APPLICATIONS

This application claims priority under 35 U.S.C. § 119 to Korean Patent Application No. 10-2023-0091355 filed on Jul. 13, 2023, in the Korean Intellectual Property Office, the disclosures of which are incorporated by reference herein in their entireties.

BACKGROUND

Various example embodiments described herein relate to a dynamic vision sensor (DVS) including a bias variation circuit, an image signal processor operating based on an output of the dynamic vision sensor, and/or an application processor, e.g., an application processor including the DVS.

An image sensor is or includes or is included in a device that converts an optical signal into an electrical signal, and includes and/or can be implemented as one or more of a charge coupled device (CCD) image sensor, a complementary metal oxide semiconductor (CMOS) image sensor, and a DVS sensor.

An output value of a pixel of the CMOS image sensor may change depending on the intensity of incident light. The CMOS image sensor generates an image signal based on the intensity of incident light. On the other hand, the DVS sensor detects an event, in which the intensity of incident light changes, and generates an event signal.

SUMMARY

Various example embodiments may provide a dynamic vision sensor capable of generating an event signal even when the intensity of incident light does not change.

Alternatively or additionally, various example embodiments may provide a processor capable of generating a gray-level image based on an event signal.

According to some example embodiments, a dynamic vision sensor (DVS) includes a photodiode configured to generate a first photodiode current in response to a change in light due to a movement of an object, a first transistor; a first node connected to the photodiode and the first transistor; a second node connected to the first transistor and being configured to receive a first voltage and receive a second voltage, a ground, a second transistor connected to the first node and the ground, a third node connected to the first transistor and the second transistor, and a current source connected to the third node, wherein the first voltage has a first level and the second voltage has a second level different from the first level.

According to some example embodiments, a dynamic vision sensor (DVS) includes a photodiode configured to generate a first photodiode current in response to a change in light due to a movement of an object, a first transistor, a first node connected to the photodiode and the first transistor, a second node connected to the first transistor, a ground, a second transistor connected to the first node and the ground, a third node connected to the first transistor and the second transistor and a current source connected to the third node and being configured to receive a first voltage and a second voltage, wherein the first voltage has a first level and the second voltage has a second level different from the first level.

BRIEF DESCRIPTION OF THE FIGURES

The above and other objects and features of various example embodiments will become apparent by describing in detail embodiments thereof with reference to the accompanying drawings.

FIG. 19 is a diagram illustrating a result of generating a gray-level image by varying different biases of a dynamic vision sensor, according to some example embodiments.

DETAILED DESCRIPTION

Hereinafter, various example embodiments may be described in detail and clearly to such an extent that an ordinary one in the art easily implements the present disclosure.

Figure 1:
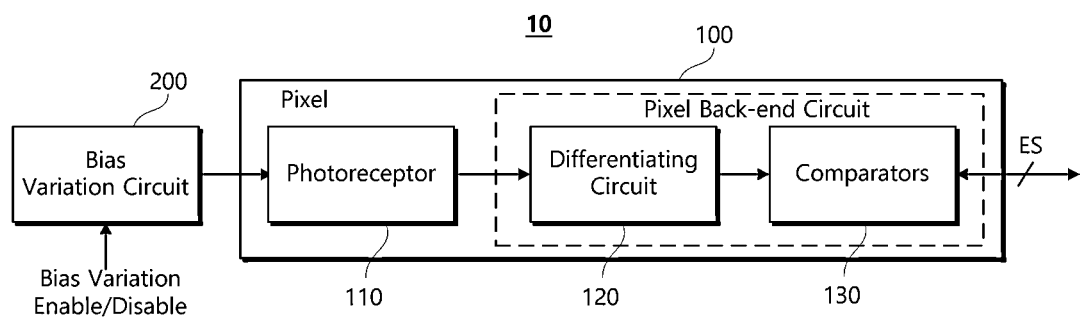
FIG. 1 is a block diagram illustrating a dynamic vision sensor, according to some example embodiments.

FIG. 1 is a block diagram illustrating a dynamic vision sensor, according to some example embodiments. Referring to FIG. 1, a dynamic vision sensor 10 includes a pixel 100 and a bias variation circuit 200.

The dynamic vision sensor 10 outputs an event signal ES generated based on a change in intensity of incident light.

A photoreceptor 110 of the pixel 100 includes a photoelectric conversion element and a converter circuit. Referring to FIG. 5, the photoelectric conversion element may be or may include a photodiode PD; however, example embodiments are not limited thereto. Various example embodiments describe the photoelectric conversion element being the photodiode PD. However, the photoelectric conversion element may alternatively or additionally be or include a photocapacitor, a photogate, a pinned photodiode PPD, and a partially pinned photodiode, or a combination thereof.

The photodiode outputs a photodiode current IPD based on incident light. The converter circuit converts the photodiode current IPD flowing through the photoelectric conversion element into a logarithmic scale voltage VLOG and outputs the logarithmic scale voltage VLOG. The converter circuit may be or may include or be included in a log amplifier As described herein, the output of a current does not mean the direction of the current, and in some example embodiments may indicate or correspond to a magnitude of the current.

The logarithmic scale voltage VLOG of the photoreceptor 110 is provided to a pixel back-end circuit. The pixel back-end circuit includes a differentiating circuit 120 and a comparator 130. The pixel back-end circuit may output the event signal ES, which corresponds to or indicates a change in intensity of incident light, based on the logarithmic scale voltage VLOG. For example, when an event where the intensity of incident light increases occurs, the pixel back-end circuit may output the event signal ES indicating an ON-event. When an event where the intensity of incident light decreases occurs, the pixel back-end circuit may output the event signal ES indicating an OFF-event. The event signal ES may include a plurality of bits corresponding to polarity information indicating whether the ON-event and the OFF-event are present.

The dynamic vision sensor 10 may be configured to process an event for each pixel or to process an event in units of column. For example, when processing the event for each pixel, the dynamic vision sensor 10 may notify an address event representation (AER) that the event occurs in the respective pixel 100, whenever the respective pixel 100 outputs the event signal ES. The column AER and row AER of the dynamic vision sensor 10 receive an event signal including polarity information from the pixel 100 in which an event occurs. When processing events in units of column, the dynamic vision sensor 10 sequentially scans each column of a pixel array at a scan cycle based on clock timing. The respective pixel 100 of the selected column transmits the event signal ES including polarity information to a row sampling circuit.

Even when there is no change in intensity or of incident light or the change is very little, the dynamic vision sensor 10 according to various example embodiments may nonetheless output the event signal ES. The dynamic vision sensor 10 may generate the event signal ES by varying at least one of biases to be supplied to pixels. At least one of the biases to be supplied to pixels may be varied by the bias variation circuit 200.

The bias variation circuit 200 receives a bias variation enable signal or a bias variation disable signal from an external processor positioned outside the dynamic vision sensor 10. The bias variation circuit 200 varies at least one of the biases to be supplied to pixels in response to the bias variation enable signal. For example, the bias variation circuit 200 may vary at least one of a plurality of biases to be supplied to the photoreceptor 110.

The bias variation circuit 200 may change the selected bias between at least two bias levels at a particular period (such as a dynamically determined, or alternatively, predetermined period). For example, the bias variation circuit 200 may periodically change a power supply voltage to be supplied to the photoreceptor 110 between a first power supply voltage level and a second power supply voltage level.

Figure 2:
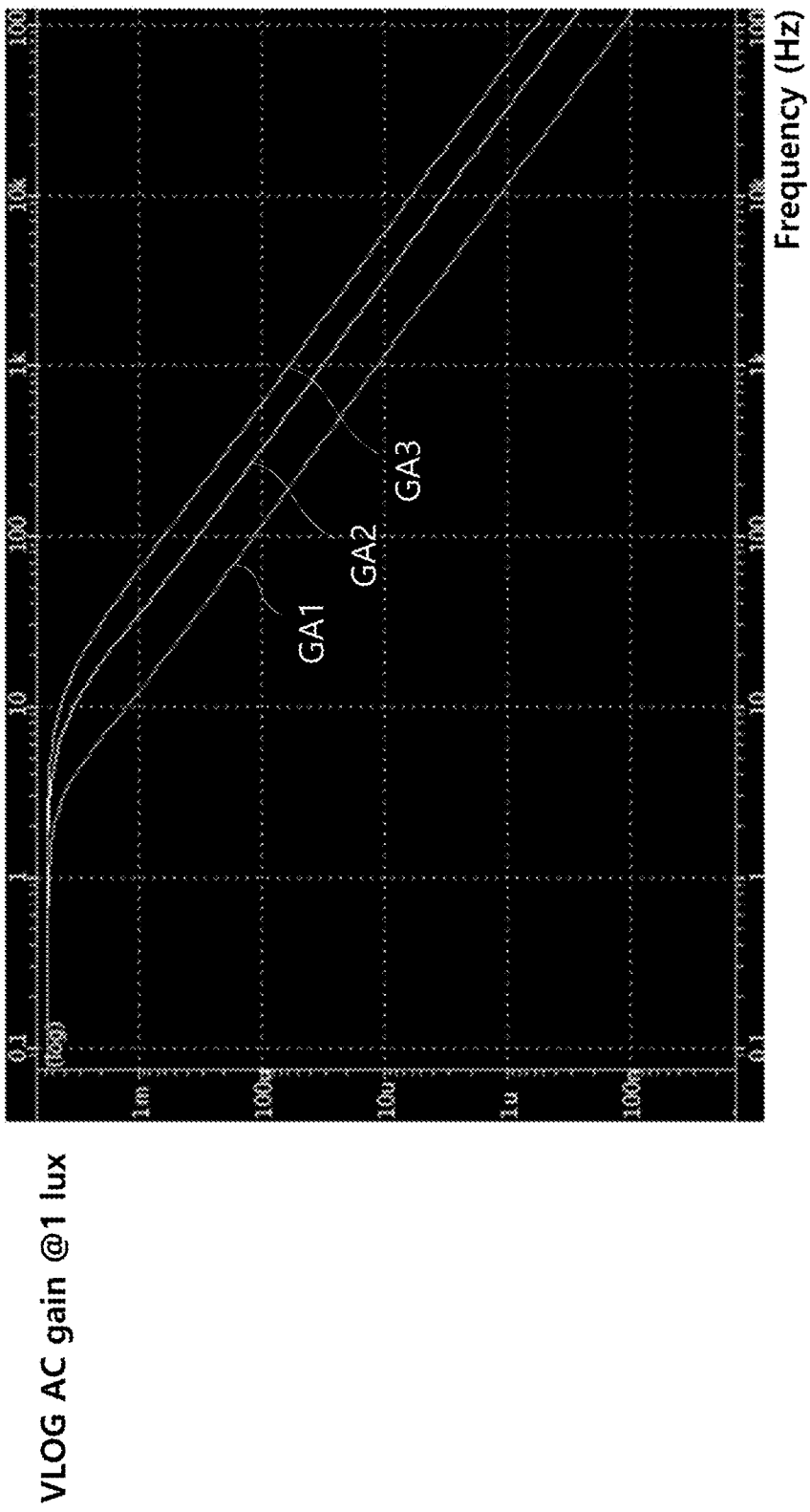
FIG. 2 is a diagram illustrating gain characteristics of a dynamic vision sensor according to illuminance.

Example embodiments have been experimentally identified that a converting gain of a converter circuit varies depending on the magnitude of the photodiode current IPD of the dynamic vision sensor. For example, referring to FIG. 2, it has been identified that a gain GA2 from binning four pixels is greater than a gain GA1 from not binning pixels of the same size. Additionally, it has been identified that a gain GA3 from binning 16 pixels is greater than the gain GA2 from binning 4 pixels.

Accordingly, a conventional dynamic vision sensor generates an event signal only when the intensity of the incident light changes. Meanwhile, even when there is no change in intensity of incident light or the change is very little, the dynamic vision sensor 10 according to various example embodiments may output the event signal ES. For example, even when there is no change in intensity of incident light or the change is very little, the dynamic vision sensor 10 may periodically vary a bias to be supplied to the photoreceptor 110. As a result, the photodiode current IPD changes. As the photodiode current IPD changes, the dynamic vision sensor 10 according to various example embodiments may output the event signal ES even when there is no change in intensity of incident light or the change is very little.

Even when there is no change in intensity of incident light or the change is very little, the dynamic vision sensor 10 may output the event signal ES based on the varied bias, and not based on a change in intensity of incident light. The dynamic vision sensor 10 and/or a processor may generate a gray-level image by using the event signal ES based on the variable bias. Accordingly, even when there is no change in intensity of incident light or the change is very little, a normal operation of an application may be guaranteed or may be more likely to be guaranteed.

For example, when a rear vehicle is driving at the same speed as a forward vehicle, Advanced Driver Assistance Systems (ADAS) in vehicles based on a conventional dynamic vision sensor and/or an object detection system in autonomous vehicles may not detect the forward vehicle. For example, when the rear vehicle is driving at the same speed as the forward vehicle, pixels of the conventional dynamic vision sensor may not generate an event signal. As a result, the object detection system of the rear vehicle may not recognize the forward vehicle temporarily and/or during a specific time. On the other hand, even when the rear vehicle is driving at the same speed as the forward vehicle, the dynamic vision sensor 10 according to various example embodiments may artificially generate the event signal ES by varying the bias and then may generate a gray-level image. Accordingly, the object detection system of the rear vehicle may normally recognize the forward vehicle based on the gray-level image.

Figure 3:
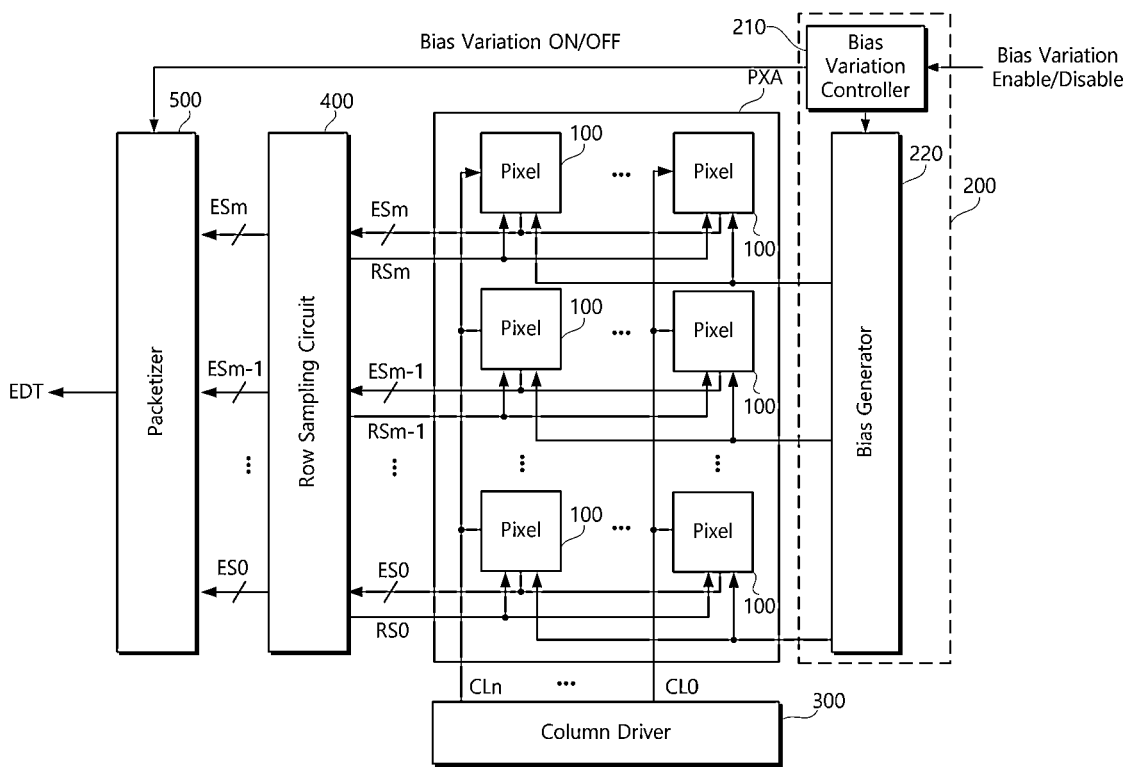
FIG. 3 is a block diagram of an example of the dynamic vision sensor of FIG. 1.

FIG. 3 is a block diagram showing the dynamic vision sensor 10, according to some example embodiments. Referring to FIG. 3, the dynamic vision sensor 10 includes a pixel array PXA, the bias variation circuit 200, a column driver 300, a row sampling circuit 400, and a packetizer 500 or packetizer circuit.

The pixel array PXA includes the plurality of pixels 100. For example, the plurality of pixels 100 may be arranged in a matrix form such as a rectangular matrix, e.g., a square matrix form. There may be dummy pixels (not shown) and/or redundancy pixels (not shown); example embodiments are not limited thereto.

The column driver 300 selects one of a plurality of columns of the pixel array PXA. The column driver 300 may select one column by transmitting selection signals CLn to CL0. The column driver 300 may sequentially select the plurality of columns at a particular dynamically determined or predetermined period. For example, the column driver 300 may select the first column of pixels by setting the first column selection signal CLn to be at a high level based on a sync signal. After the first column of pixels transmit event signals ESm to ES0 to the row sampling circuit 400, the column driver 300 may set the second column selection signal CLn−1 to be at a high level based on the sync signal. In other words, the dynamic vision sensor 10 may process an event signal of each pixel in units of column based on the sync signal. Here, m and n are integers, and n may be greater than, less than, or equal to m.

Pixels of the column selected by the column driver 300 transmit the event signals ESm to ES0 to the row sampling circuit 400. The event signal may include a plurality of bits corresponding to polarity information indicating whether an ON-event and an OFF-event are present. The row sampling circuit 400 may transmit a reset signal RS to a pixel that transmits an event signal (ON-event signal) including the ON-event. The pixel 100 receiving the reset signal RS may initialize the differentiating circuit 120.

The row sampling circuit 400 may generate an address of the pixels 100 that generate the ON-event signal, and then may transmit the address and the event signals ESm to ES0 to the packetizer 500. Alternatively, the row sampling circuit 400 may transmit the address and the event signals ESm to ES0 of all the pixels 100 of the selected column to the packetizer 500. The address may include at least one of the column address and row address of the pixel 100. The row sampling circuit 400 may transmit a time, at which the ON-event occurs, to the packetizer 500. When transmitting only the address and the event signals ESm to ES0 of the pixels 100, which generate the ON-event signal, to the packetizer 500, the row sampling circuit 400 may transmit the time, at which the ON-event occurs, to the packetizer 500 together.

The packetizer 500 generates and outputs the event data EDT, which is obtained by packetizing the event signals ESm to ES0, the address, and the time, at which the ON-event occurs, for the pixel 100 that generates the ON-event signal or all the pixels 100 in a specific column. The packet may be generated in units of pixel, column, or frame including all the columns. The packetizer 500 transmits the generated packet to a processor.

The bias variation circuit 200 of the dynamic vision sensor 10 according to some example embodiments may receive a bias variation enable signal. A bias variation controller 210 may periodically change and transmit bias data to a bias generator 220. The bias generator 220 may provide the respective pixels 100 with the changed bias. The bias variation controller 210 may periodically vary a bias between a plurality of bias levels. At least one bias included in the photoreceptor 110 of the pixels 100 may be changed based on the varied bias. The pixels 100 may generate the event signals ESm to ES0 based on the variable bias and may transmit the event signals ESm to ES0 to the row sampling circuit 400.

The bias variation circuit 200 may transmit a bias variation ON signal corresponding to a bias variation enable signal or a bias variation OFF signal corresponding to a bias variation disable signal to the packetizer 500. The packetizer 500 may generate a packet (referred to as "event data"), to which information bits corresponding to the bias variation ON signal or bias variation OFF signal are added, and may transmit the packet to the processor. Accordingly, the processor may determine whether an event signal included in the received packet is an event signal generated by a change in intensity of incident light or an event signal generated based on the varied bias.

Figure 4:
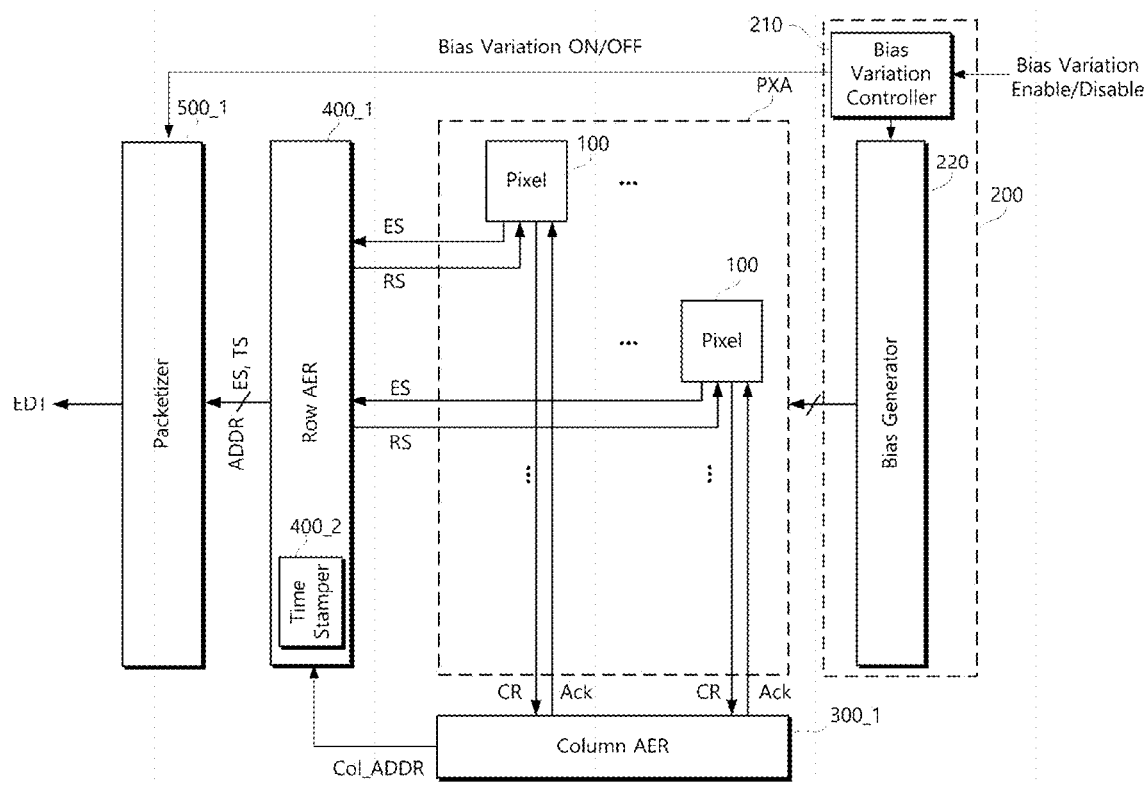
FIG. 4 is a block diagram of an example of the dynamic vision sensor of FIG. 1.

FIG. 4 is a block diagram showing the dynamic vision sensor 10, according to some example embodiments. Components the same as or similar to those described with reference to FIGS. 1 to 3 will be marked by using the same or similar reference numerals, and redundant descriptions will be omitted.

Referring to FIG. 4, the dynamic vision sensor 10 includes the pixel array PXA, the bias variation circuit 200, a column AER 300_1, a row AER 400_1, and a packetizer 500_1.

The pixel array PXA includes the plurality of pixels 100. For example, the plurality of pixels 100 may be arranged in a matrix form.

The pixel 100 may transmit an occurrence notification CR of an ON-event to the column AER 300_1. The column AER 300_1 may generate a column address of a pixel in which the ON-event occurs. The column AER 300_1 may transmit an acknowledgement signal Ack to the pixel, in which the ON-event occurs, in response to the occurrence notification CR of the ON-event. The pixel 100, which receives the acknowledgment signal Ack, may transmit the event signal ES to the row AER 400_1. The row AER 400_1 may transmit the reset signal RS to the pixel 100 transmitting the event signal ES in response to the event signal ES. The pixel 100 receiving the reset signal RS may initialize the differentiating circuit 120.

The row AER 400_1 may generate the row address of the pixels 100 that generated the ON-event signal. A time stamper 400_2 may generate a time stamp TS indicating a point in time, at which the ON-event occurs. The row AER 400_1 may transmit a row address, a column address, the time stamp TS, and the event signal ES to a packetizer 500_1.

The packetizer 500_1 may generate and output the event data EDT, which is obtained by packetizing the row address, the column address, the time stamp TS, and the event signal ES of the pixel 100 that generates the ON-event signal. The packetizer 500_1 may transmit the generated packet to the processor.

In the dynamic vision sensor 10 according to some example embodiments, the bias variable circuit 200 may receive a bias variable enable signal and may vary at least one bias included in the photoreceptor 110 of the pixels 100. The pixels 100 may notify the column AER 300_1 of the ON-event that is generated based on the varied bias. The pixels 100 may generate the event signal ES based on the varied bias and may transmit the event signal ES to the row AER 400_1.

The bias variation circuit 200 may transmit, to the packetizer 500-1, a bias variation ON signal corresponding to a bias variation enable signal or a bias variation OFF signal corresponding to a bias variation disable signal. The packetizer 500_1 may generate a packet by adding information bits corresponding to the bias variation ON signal or bias variation OFF signal together with the row address, the column address, the time stamp TS, and the event signal ES. The packetizer 500_1 may transmit a packet, to which information bits corresponding to the bias variation ON signal or the bias variation OFF signal are added, to the processor. Accordingly, the processor may determine whether an event signal included in the received packet is an event signal generated by a change in intensity of incident light or an event signal generated based on the varied bias.

Figure 5A:
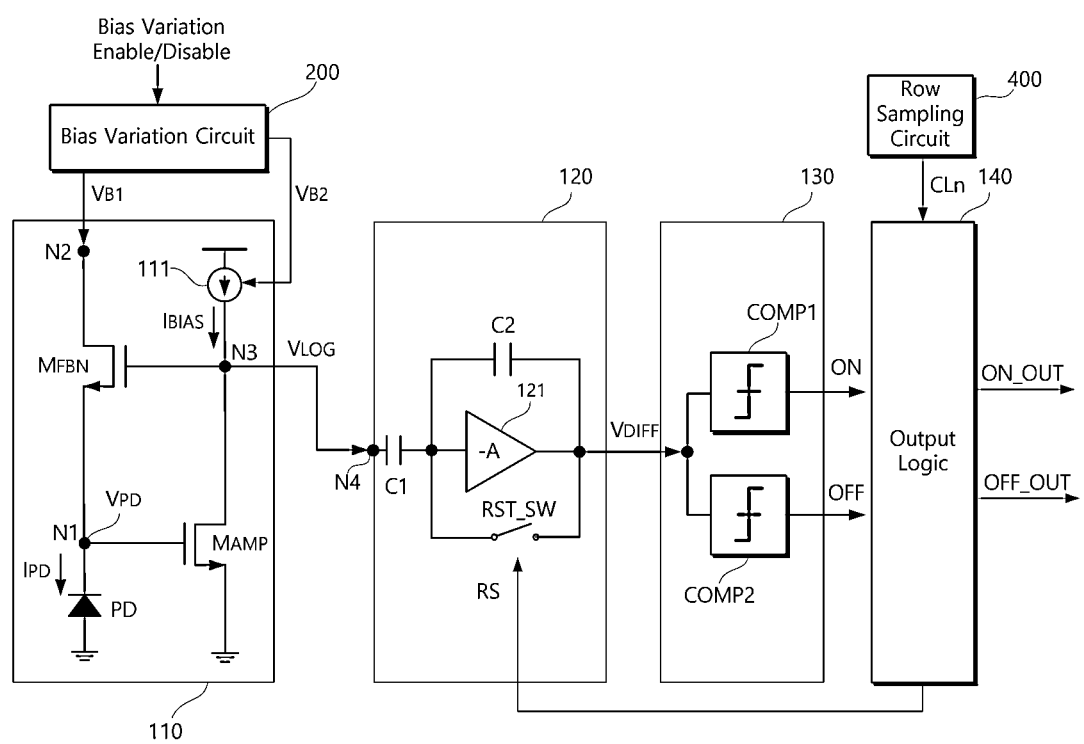
FIG. 5A is a circuit diagram of a dynamic vision sensor according to an embodiment of FIG. 1.
Figure 5B:
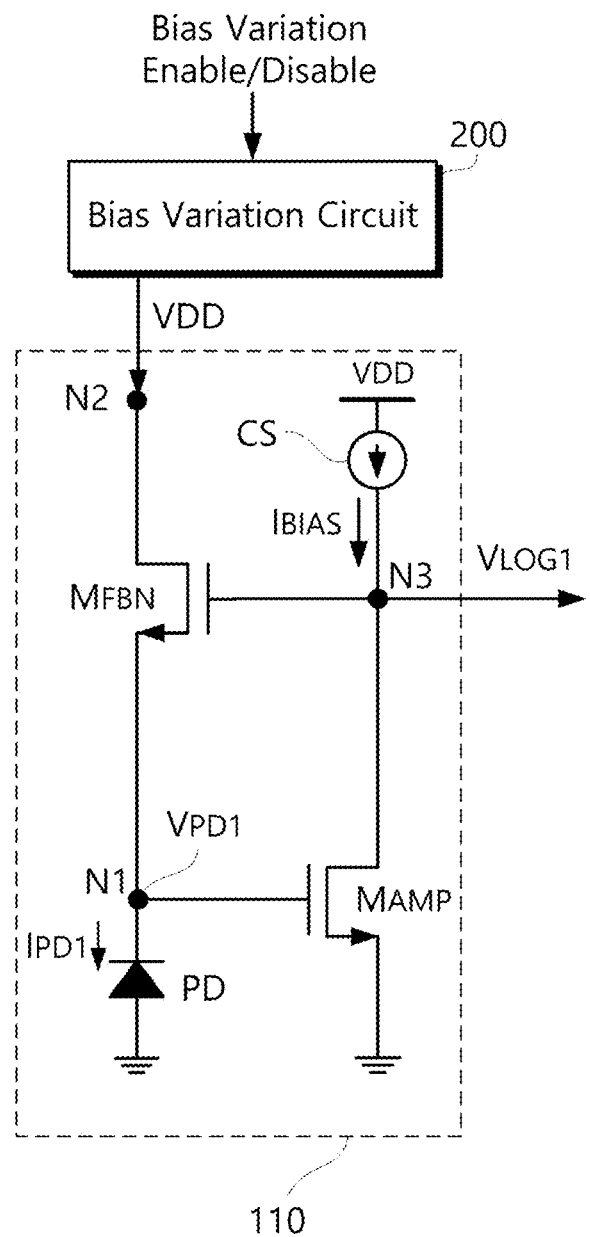
FIGS. 5B, 5C, 5D and 5E are circuit diagrams of a photoreceptor according to an embodiment of FIG. 5A.
Figure 5C:
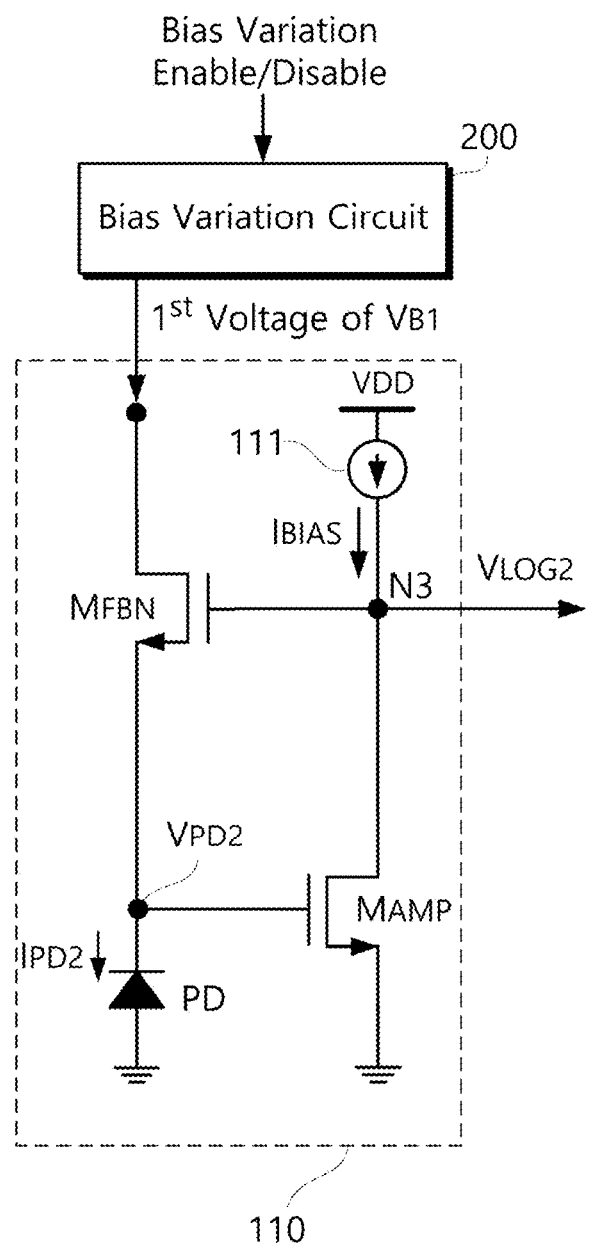
Figure 5D:
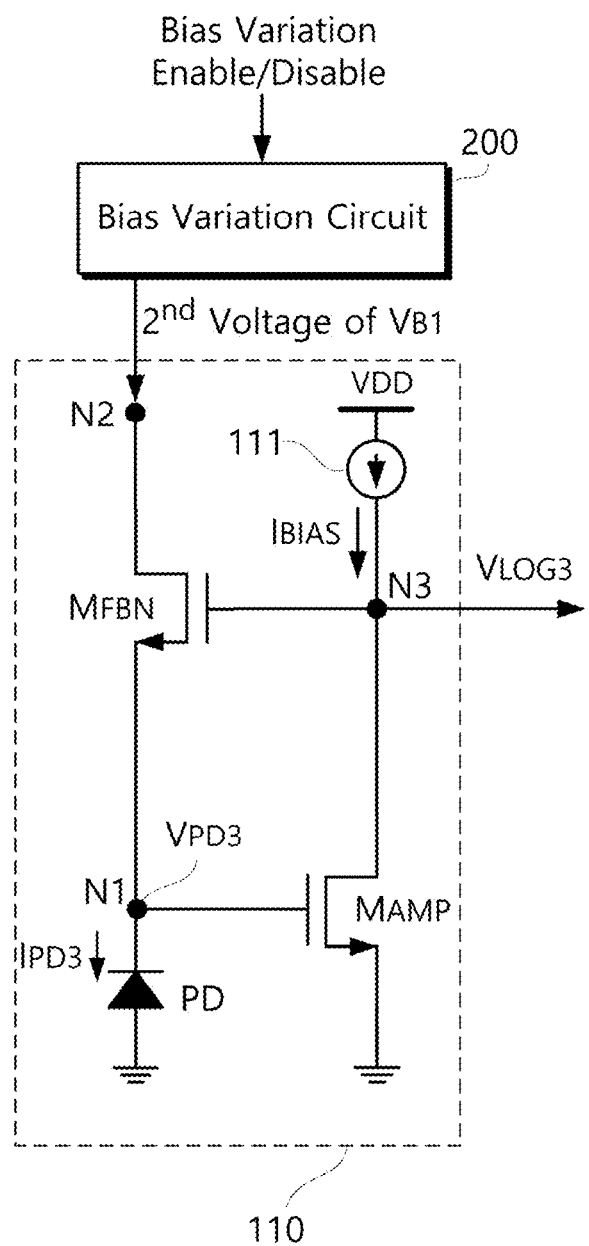

FIG. 5A is a circuit diagram illustrating the dynamic vision sensor 10 according to an embodiment of FIG. 3. FIGS. 5B, 5C, 5D and 5E are circuit diagrams illustrating the photoreceptor 110 according to an embodiment of FIG. 5A. Components the same as or similar to those described above will be marked by using the same or similar reference numerals, and redundant descriptions will be omitted. The dynamic vision sensor 10 in FIG. 5 is described on the premise of the pixel 100 of the dynamic vision sensor 10 according to an embodiment of FIG. 3. However, the pixel 100 of the dynamic vision sensor 10 according to an embodiment of FIG. 4 may also be implemented similarly.

Referring FIG. 5A, the dynamic vision sensor 10 according to some example embodiments includes the photoreceptor 110, the differentiating circuit 120, the comparator 130, output logic 140, and the bias variation circuit 200.

The photoreceptor 110 includes a photodiode PD, a feedback transistor MFBN, and a converter circuit. The converter circuit may be a log amplifier circuit.

The log amplifier circuit may include a log amplifier transistor MAMP and a constant current source 111, which are connected to a gate node of the feedback transistor MFBN. The gate node of the log amplifier transistor MAMP may be connected to the photodiode PD.

The photodiode current IPD flows through the photodiode PD. The photodiode current IPD may be different based on a level of the power supply voltage to a node N2. In this specification, the output of a current does not mean the direction of the current. The log amplifier circuit converts the photodiode current IPD into the logarithmic scale voltage VLOG. The logarithmic scale voltage VLOG is provided to the differentiating circuit 120 of a pixel back-end circuit through a node N4.

Figure 6:
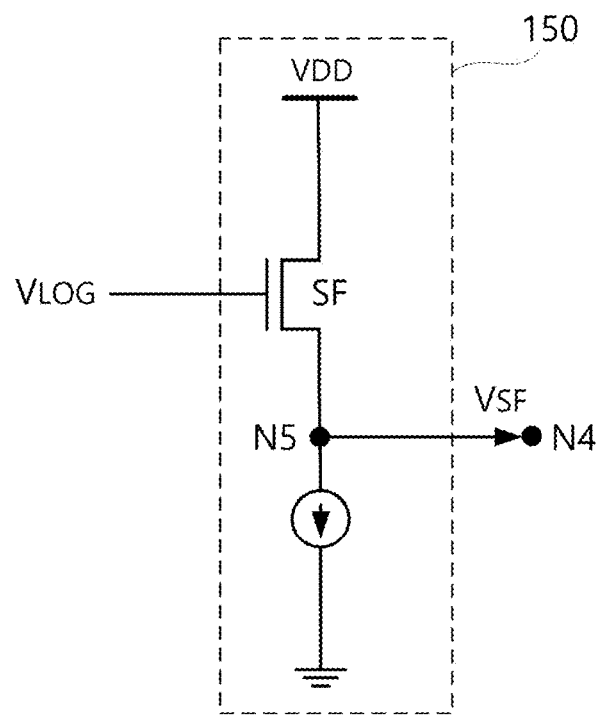
FIG. 6 is a diagram illustrating an example of a voltage buffer circuit of a dynamic vision sensor, according to some example embodiments.

The differentiating circuit 120 may receive the logarithmic scale voltage VLOG from the photoreceptor 110 and may generate an output voltage VDIFF obtained by amplifying the logarithmic scale voltage VLOG. In another embodiment, the differentiating circuit 120 may selectively generate an output voltage VDIFF obtained by amplifying a voltage VSF received from a voltage buffer circuit 150 of FIG. 6. The voltage buffer circuit 150 may receive the logarithmic scale voltage VLOG from the photoreceptor 110 and may output the voltage VSF.

The differentiating circuit 120 includes a first capacitor C1, a second capacitor C2, an operational amplifier 121, and a reset switch RST_SW. When the differentiating circuit 120 generates the output voltage VDIFF obtained by amplifying the voltage VSF provided by the voltage buffer circuit 150, the capacitance ratio or capacitance value of the first capacitor C1 and the second capacitor C2 may be different from that in the case of receiving the logarithmic scale voltage VLOG.

The differentiating circuit 120 is connected to the output node N3 of the log amplifier circuit of the photoreceptor 110 or the voltage buffer circuit 150 through the first capacitor C1. The second capacitor C2 is connected between the input and output of the operational amplifier 121. The reset switch RST_SW is connected in parallel with the second capacitor C2 between the input and output of the operational amplifier 121. The reset switch RST_SW is closed in response to the reset signal RS, and the differentiating circuit 120 is initialized. The reset signal RS may be received from the output logic 140.

The differentiating circuit 120 amplifies an input voltage received from the log amplifier circuit or the voltage buffer circuit 150 depending on a capacitance ratio between the first capacitor C1 and the second capacitor C2. The capacitance of each of the first capacitor C1 and the second capacitor C2 may be selected in consideration of an amplification ratio and a time interval of continuous event occurrence.

The comparator 130 compares the level of the output voltage VDIFF of the differentiating circuit 120 and a level of a reference voltage VREF thus provided. On the basis of the comparison result, the comparator 130 outputs an event signal for determining whether the intensity of light incident onto the photodiode PD increases or decreases. The comparator 130 may include a plurality of comparison circuits COMP1 to COMP2. When the intensity of incident light increases, the first comparison circuit COMP1 in the comparator 130 may output a voltage of a high level, and the second comparison circuit COMP2 in the comparator 130 may output a voltage of a low level. When the intensity of incident light decreases, the first comparison circuit COMP1 in the comparator 130 may output a voltage of a low level, and the second comparison circuit COMP2 in the comparator 130 may output a voltage of a high level. The plurality of comparison circuits COMP1 and COMP2 may have different reference voltages for determining the ON-event signal and the off-event signal.

The output logic 140 may output event signals ON_OUT and OFF_OUT. The output logic 140 may provide the event signals ON_OUT and OFF_OUT to the row sampling circuit 400 described with reference to FIG. 3 or the row AER 400_1 described with reference to FIG. 4. The output logic 140 may receive the reset signal RS from the row sampling circuit 400 illustrated in FIG. 3 or the row AER 400_1 illustrated in FIG. 4 in response to the ON-event signal ON_OUT.

Even when the intensity of incident light does not change, the dynamic vision sensor 10 according to some example embodiments may output the event signals ON_OUT and OFF_OUT by the varied bias provided by the bias variation circuit 200.

The bias variation circuit 200 may vary at least one bias among a plurality of biases provided to the photoreceptor 110. For example, the bias variation circuit 200 may vary at least one of a power supply voltage bias VB1 provided to the photoreceptor 110 and a bias current IBIAS of the log amplifier circuit.

In an embodiment, when receiving a bias variation disable signal, the bias variation circuit 200 provides the power supply voltage VDD to the photoreceptor 110 through the node N2. When receiving a bias variation enable signal, the bias variation circuit 200 may provide the photoreceptor 110 with the power supply voltage bias VB1 of a first level and the power supply voltage bias VB1 of a second level by periodically varying the power supply voltage bias VB1. The level of the power supply voltage VDD may be different from the level of and the power supply voltage bias VB1. Referring FIG. 5B, when the power supply voltage VDD is provided to the node N2, and a first photodiode current IPD1 flows through the photodiode PD in response to a change in light due to a movement of an object. Referring FIG. 5C, when the power supply voltage bias VB1 of the first level is provided to the node N2, and a second photodiode current IPD2 flows through the photodiode PD. Referring FIG. 5D, when the power supply voltage bias VB1 of the second level is provided to the node N2, and a third photodiode current IPD3 flows through the photodiode PD.

In an embodiment, when receiving a bias variation disable signal, the bias variation circuit 200 provides the power supply voltage bias VB1 of a first level to the photoreceptor 110 through the node N2. The power supply voltage bias VB1 of the first level may be same with the power supply voltage VDD. When receiving a bias variation enable signal, the bias variation circuit 200 may provide the photoreceptor 110 with the power supply voltage bias VB1, which is obtained by periodically varying the power supply voltage of the first level and the power supply voltage of a second level different from the first level.

Figure 5E:
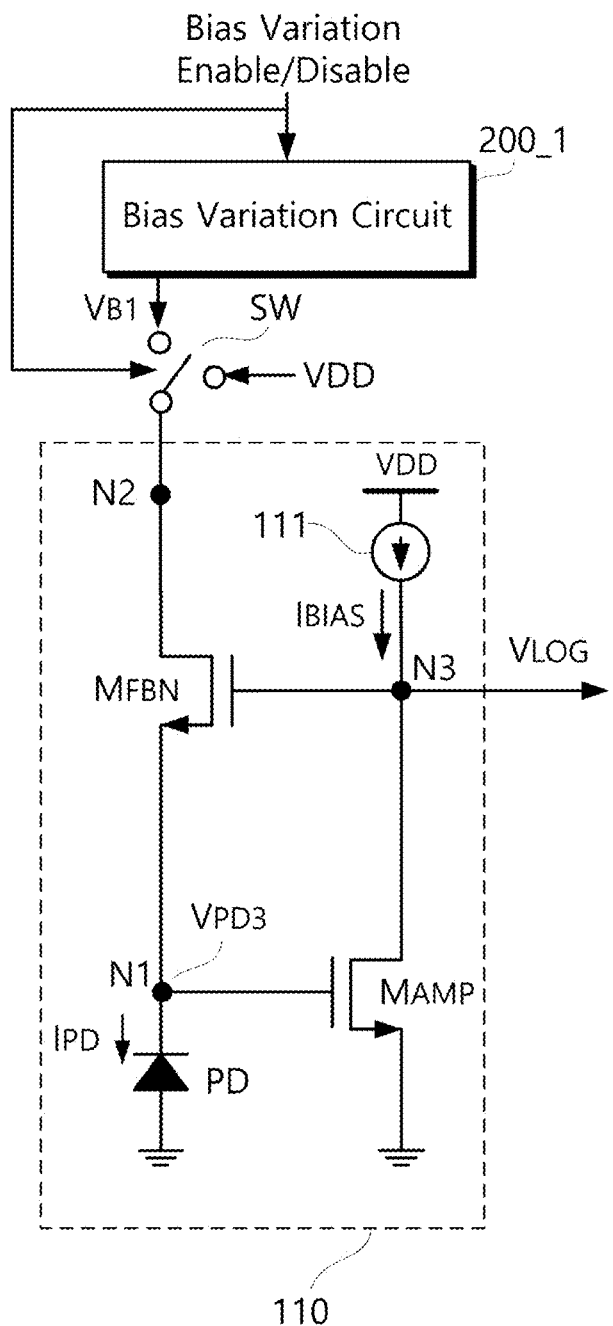

In an embodiment, referring FIG. 5E, switch SW may select a power supply voltage which is provided to a node N2 from a power supply voltage bias VB1 and a power supply voltage VDD based on a bias variation enable signal and a bias variation disable signal. A bias variation circuit 200_1 may provide the power supply voltage bias VB1 based on the bias variation enable signal.

Alternatively, in an embodiment, when receiving the bias variation disable signal, the bias variation circuit 200 provides a voltage bias VB2 to the constant current source 111 of the photoreceptor 110 such that a bias current of a third level flows to the node N3. When receiving the bias variation enable signal, the bias variation circuit 200 may periodically vary the voltage bias VB2 provided to the constant current source 111 such that the bias current of the third level and the bias current of the fourth level lower than the third level change periodically and flow. In other embodiment, when receiving the bias variation enable signal, the bias variation circuit 200 may periodically vary the voltage bias VB2 provided to the constant current source 111 such that the bias current of a fourth level and the bias current of a fifth level change periodically and flow. The bias current of the fourth level and the bias current of the fifth level may be different from the bias current of the third level.

Figure 7:
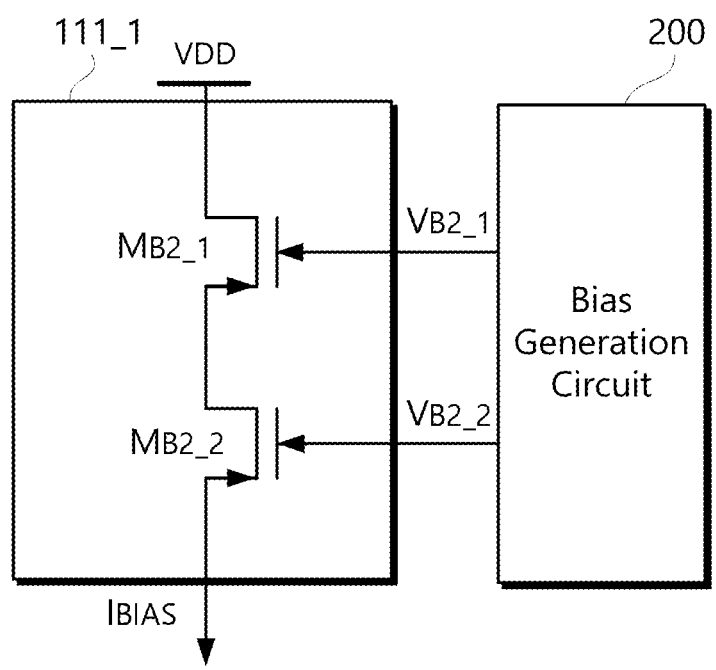
FIG. 7 is a diagram illustrating a method of varying a bias current of the dynamic vision sensor of FIG. 1.

For example, referring to FIG. 7, the constant current source 111 of the log amplifier circuit may be a constant current source circuit 111_1 in which a plurality of transistors MB2_1 and MB2_2 are connected in series to the power supply voltage VDD. When the bias variation circuit 200 receives a bias variation disable signal, a bias current of the third level flows to the node N3 by setting voltage biases VB2_1 and VB2_2 provided to gate nodes of the transistors MB2_1 and MB2_2 of the constant current source circuit 111_1. When receiving the bias variation enable signal, the bias variation circuit 200 may periodically vary the voltage biases VB2_1 and VB2_2 provided to the gate nodes of the transistors MB2_1 and MB2_2. Accordingly, the magnitude of the bias current IBIAS may periodically vary between the third level and the fourth level smaller than the third level.

Figure 8:
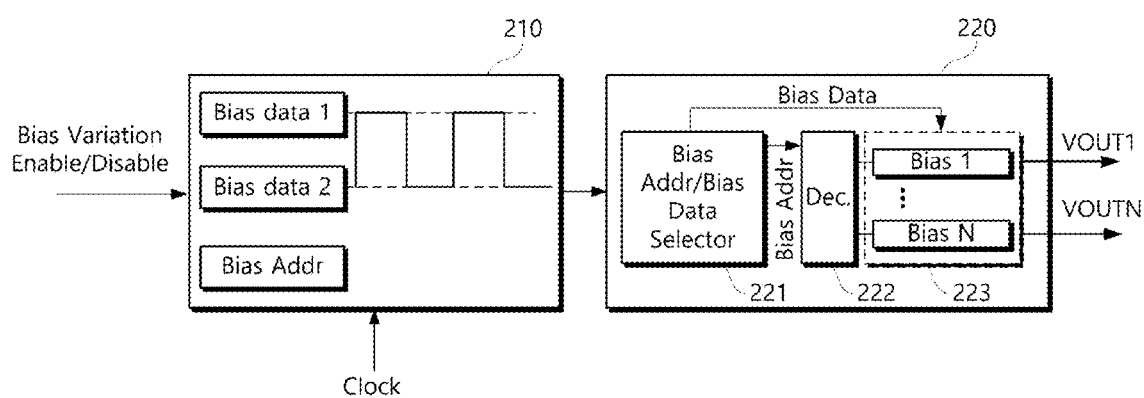
FIG. 8 is a diagram illustrating an example of a bias variation circuit of the dynamic vision sensor of FIG. 1.

FIG. 8 is a block diagram illustrating a configuration of the bias variation circuit 200, according to some example embodiments. The bias variation circuit 200 includes a bias variation controller 210 and a bias generator 220.

Referring to FIG. 8, the bias generator 220 may include a plurality of bias circuits Bias 1 to Bias N capable of outputting a plurality of bias VOUT1 to VOUTN. The bias generator 220 may receive, from the bias variation controller 210, a bias address Bias Addr indicating a bias to be set, and bias data Bias Data indicating a value of the bias to be set.

A selector 221 of the bias generator 220 may latch the received bias address Bias Addr and the received bias data Bias Data. A decoder 222 may select a bias to be varied by decoding the received bias address Bias Addr. The selector 221 may set a value corresponding to the received bias data Bias Data to a setting bit of a circuit 223 of the selected bias. For example, the bias address Bias Addr may be decoded, and a gate node voltage Bias 1 of the first transistor may be selected as a bias to be set. A bias voltage value based on the bias data Bias Data may be set to a voltage value of the gate node voltage Bias 1 of a first transistor. The gate node voltage Bias 1 of the first transistor may be output (VOUT1) as the set voltage value.

In response to receiving a bias variation disable signal, the bias variation controller 210 according to some example embodiments may transmit first bias data Bias data 1 to the bias generator 220 so as to output a bias having a first value. The bias variation controller 210 may periodically and alternately transmit the first bias data Bias data 1 and second bias data Bias data 2 to the bias generator 220 in response to receiving the bias variation enable signal. The first bias data Bias data 1 and the second bias data Bias data 2 may be alternately transmitted based on a clock signal Clock. The second bias data Bias data 2 may be bias data that sets a bias generator to output a bias having a lower value than the first value.

The bias address Bias Addr may be set in advance for the bias variation controller 210. The bias addresses Bias Addr corresponding to one or more biases may be stored in advance in a register. The bias data Bias Data, which is a value to be varied for each bias, may be stored in advance in a register. The bias variation controller 210 may receive information bits indicating a specific bias and may select the bias address Bias Addr and the bias data Bias Data of the bias corresponding to the information bits from the register. Alternatively, the bias address Bias Addr and/or the bias data Bias Data may be received together with a bias variation enable/disable signal.

Figure 9:
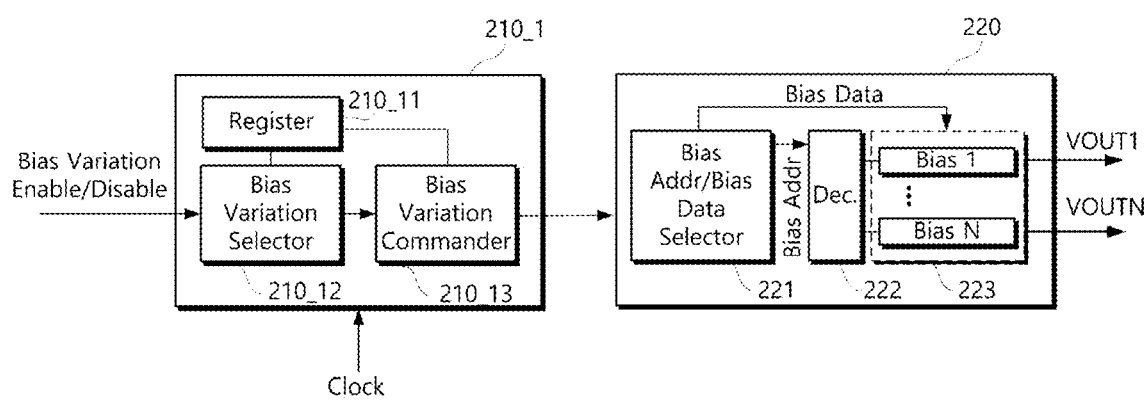
FIG. 9 is a diagram illustrating an example of a bias variation circuit of the dynamic vision sensor of FIG. 1.

FIG. 9 is a block diagram illustrating a configuration of the bias variation circuit 200, according to some example embodiments. The bias variation circuit 200 includes a bias variation controller 210_1 and the bias generator 220. Detailed descriptions of parts identical or similar to those described with reference to FIG. 8 will be omitted to avoid redundancy.

The bias variation controller 210_1 according to some example embodiments may store the bias addresses Bias Addr and the bias data Bias Data of a plurality of biases in advance in a register 210_11.

The bias variation controller 210_1 may receive a bias variation enable/disable signal. The bias variation controller 210_1 may receive information bits for specifying a bias.

The bias variation controller 210_1 may receive information bits for specifying one mode among a plurality of bias variation modes. For example, a bias variation mode applied to a dynamic vision sensor used in a front camera of a vehicle may be different from a dynamic vision sensor used in an in-room camera of the vehicle. For example, the dynamic vision sensor used in the front camera of the vehicle may vary a power supply voltage of a photoreceptor in the bias variation mode. On the other hand, the dynamic vision sensor used in the in-room camera of the vehicle may vary a bias current of the photoreceptor in the bias variation mode.

A bias variation selector 210_12 may transmit, to a bias variation commander 210_13, the bias address Bias Addr of the bias corresponding to information bits. A bias variation commander 210_13 may select the bias data Bias Data corresponding to the bias address Bias Addr and may provide the selected bias data Bias Data to the bias generator 220 together with the bias address Bias Addr.

Figure 10:
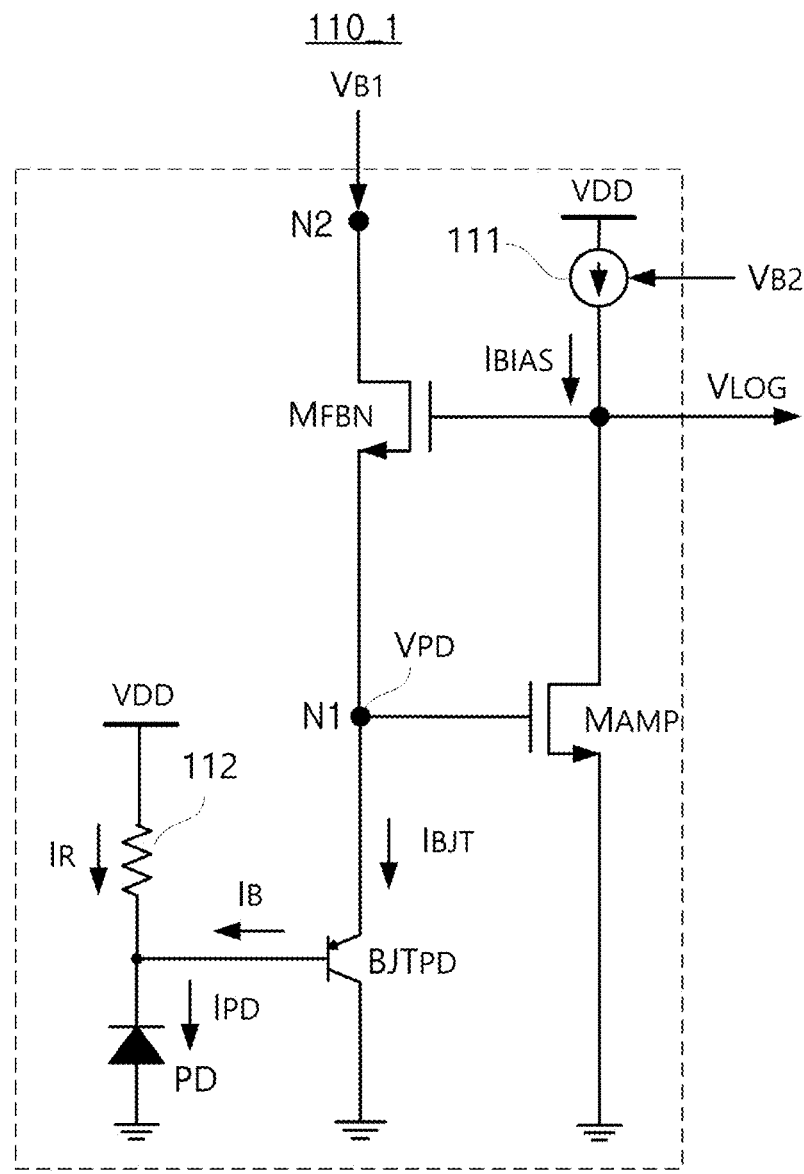
FIG. 10 is a diagram illustrating an example of a photoreceptor of a dynamic vision sensor, according to some example embodiments.

FIG. 10 is a circuit diagram of a photoreceptor 110_1, according to some example embodiments. In the photoreceptor 110_1 in FIG. 10, a log amplifier circuit converts and outputs a BJT current IBJT flowing into a BJT element BJTPD connected to the photodiode PD, not the photodiode current IPD flowing into the photodiode PD, into the logarithmic scale voltage VLOG. Detailed descriptions of parts identical or similar to the above-described parts will be omitted to avoid redundancy.

Referring to FIG. 10, the photodiode PD is connected to a base of the BJT element BJTPD. A base current is amplified, and a collector current flows into a collector of the BJT element BJTPD. A current, which is obtained by summing the collector current and the base current, flows into an emitter of the BJT element BJTPD. The BJT current IBJT flows with a current (IBJT=($\beta$+1) IPD; $\beta$=collector current/base current) greater than the photodiode current IPD. Accordingly, a drag phenomenon of an object due to a decrease in the current flowing into a photodiode of a conventional dynamic vision sensor may be reduced in a low-light environment. Moreover, the dynamic vision sensor according to an embodiment of FIG. 10 may reduce a time required to generate an event in a low-light environment.

A pixel back-end circuit generates an event signal based on the logarithmic scale voltage VLOG obtained by converting the BJT current IBJT.

The bias variation circuit 200 may vary at least one bias provided to the photoreceptor 110_1. For example, the power supply voltage bias VB1 provided to the photoreceptor 110_1 or the bias current IBIAS flowing through the constant current source 111 of the log amplifier circuit may be varied. When varying the bias current IBIAS flowing into the constant current source 111, the bias variation circuit 200 may vary the voltage bias VB2 provided to the constant current source 111. Accordingly, even when there is no change in intensity of incident light or the change is very little, the dynamic vision sensor according to an embodiment of FIG. 10 may output the event signal ES based on the varied bias, not the event signal ES based on a change in intensity of incident light. The dynamic vision sensor 10 or processor according to an embodiment of FIG. 10 may generate a gray-level image by using the event signal ES based on the variable bias. Accordingly, even when there is no change in intensity of incident light or the change is very little, a normal operation of an application may be guaranteed.

Figure 11:
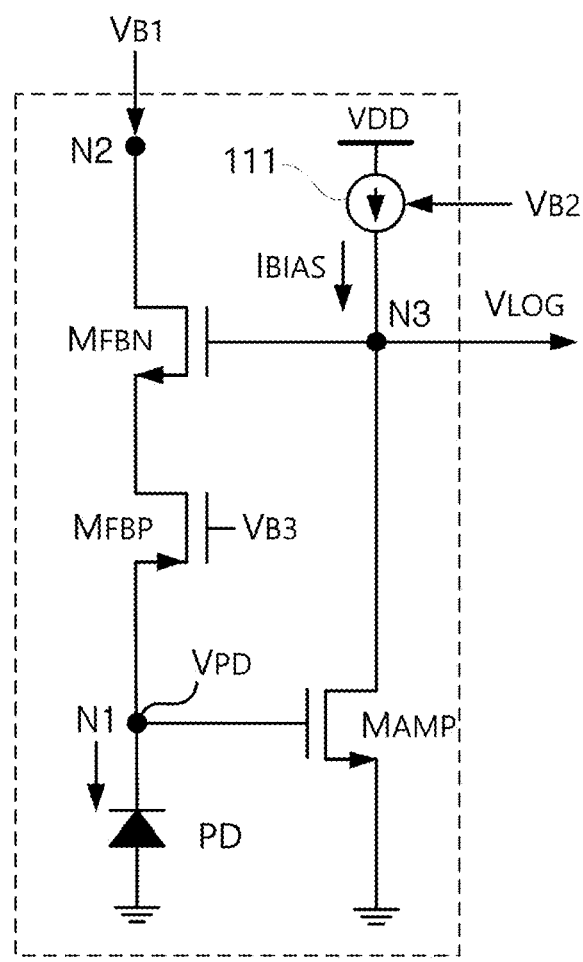
FIG. 11 is a diagram illustrating an example of a photoreceptor of a dynamic vision sensor, according to some example embodiments.

FIG. 11 is a circuit diagram of a photoreceptor 110_2, according to some example embodiments. Unlike the photoreceptor 110 described with reference to FIG. 5, the photoreceptor 110_2 of FIG. 11 includes a feedback gain control transistor MFBP connecting the feedback transistor MFBN and the photodiode PD. Detailed descriptions of parts identical or similar to the above-described parts will be omitted to avoid redundancy.

A drain node of the feedback gain control transistor MFBP according to some example embodiments is connected to a source node of the feedback transistor MFBN. A source node of the feedback gain control transistor MFBP is connected to the photodiode PD and a gate node of the log amplifier transistor MAMP through a node N1. The capacitance of capacitors included in the differentiating circuit 120 may be reduced by adjusting a gain by the feedback gain control transistor MFBP. Accordingly, the size of the differentiating circuit 120 may be reduced.

The bias variation circuit 200 may vary at least one bias provided to the photoreceptor 110_2. For example, the power supply voltage bias VB1 provided to the photoreceptor 110_2, the bias current IBIAS flowing through the constant current source 111 of the log amplifier circuit, or a gate node voltage bias VB3 of the feedback gain control transistor MFBP may be varied. Accordingly, even when there is no change in intensity of incident light or the change is very little, the dynamic vision sensor according to an embodiment of FIG. 11 may output the event signal ES based on the varied bias, not the event signal ES based on a change in intensity of incident light. As a result, even when there is no change in intensity of incident light or the change is very little, a normal operation of an application may be guaranteed.

Figure 12:
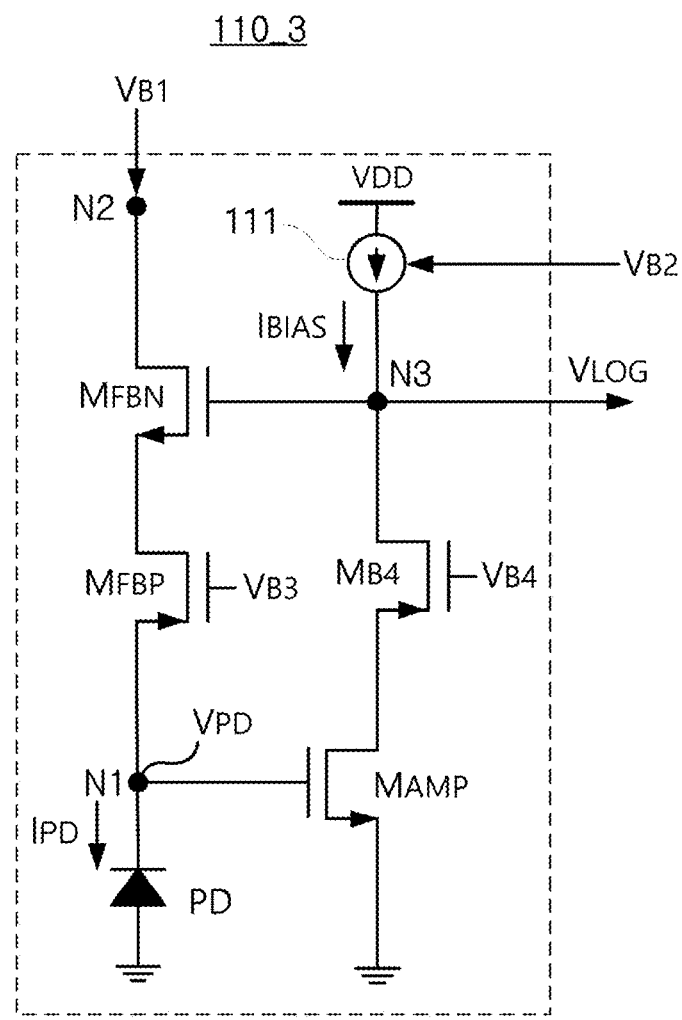
FIG. 12 is a diagram illustrating an example of a photoreceptor of a dynamic vision sensor, according to some example embodiments.

FIG. 12 is a circuit diagram of a photoreceptor 110_3, according to some example embodiments. Unlike the photoreceptor 110_2 described with reference to FIG. 11, a log amplifier circuit in the photoreceptor 110_3 in FIG. 12 includes a transistor MB4. Detailed descriptions of parts identical or similar to the above-described parts will be omitted to avoid redundancy.

A drain node of the transistor MB4 according to some example embodiments is connected to a gate node of the feedback transistor MFBN through the node N3. A source node of the transistor MB4 is connected to a drain node of the log amplifier transistor MAMP. The amplification degree of a log amplifier circuit may be finely adjusted by the transistor MB4.

The bias variation circuit 200 may vary at least one bias provided to the photoreceptor 110_3. For example, the power supply voltage bias VB1 provided to the photoreceptor 110_3, the bias current IBIAS flowing through the constant current source 111 of the log amplifier circuit, the gate node voltage bias VB3 of the feedback gain control transistor MFBP, or a gate node voltage bias VB4 of the transistor MB4 may be varied. Accordingly, even when there is no change in intensity of incident light or the change is very little, the dynamic vision sensor according to an embodiment of FIG. 12 may output the event signal ES based on the varied bias, not the event signal ES based on a change in intensity of incident light. As a result, even when there is no change in intensity of incident light or the change is very little, a normal operation of an application may be guaranteed.

Figure 13:
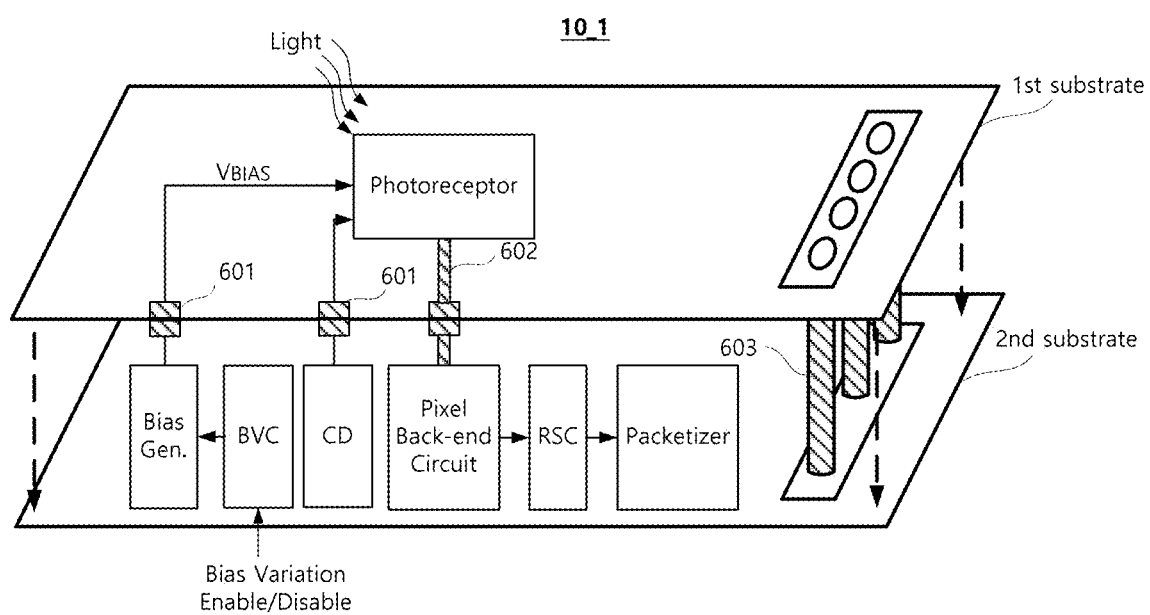
FIG. 13 is a diagram illustrating a configuration of a plurality of substrates of a dynamic vision sensor, according to some example embodiments.

FIG. 13 is a block diagram of a dynamic vision sensor 10_1, according to some example embodiments. The dynamic vision sensor 10_1 according to an embodiment of FIG. 13 may be composed of a plurality of substrates. Detailed descriptions of parts identical or similar to the above-described parts will be omitted to avoid redundancy.

In some example embodiments, the dynamic vision sensor 10_1 may be a stacked dynamic vision sensor including a plurality of vertically stacked substrates electrically connected to each other. The dynamic vision sensor 10_1 described with reference to FIG. 13 is described on the premise of an embodiment of FIG. 3, but an embodiment of FIG. 4 may also be applied similarly. Embodiments below are illustrative and the present disclosure does not specifically limit a method of stacking substrates.

A photoreceptor may be positioned on a first substrate among the plurality of substrates, and a pixel back-end circuit may be positioned on a second substrate electrically connected to the first substrate. A row sampling circuit RSC, a column driver CD, a packetizer, a bias variation controller BVC, and a bias generator Bias Gen may be positioned on the second substrate.

Optionally or additionally, a voltage buffer may be positioned on the second substrate together with a pixel back-end circuit. The voltage buffer may be the voltage buffer circuit 150 described with reference to FIG. 6.

Among the stacked substrates, the photoreceptor on the first substrate and the pixel back-end circuit on the second substrate may be electrically connected to each other through an in-pixel interconnector 602. For example, the photoreceptor on the first substrate and the pixel back-end circuit on the second substrate may be electrically connected through in-pixel Cu-to-Cu (C2C) bonding or in-pixel through-silicon-via (TSV).

The column driver CD on the second substrate may transmit a selection signal to the photoreceptor on the first substrate through a signal path connected to a C2C bonding 601 or a TSV 603 or a signal path connected through TSV. The column bias variation controller BVC on the second substrate may receive a bias variation enable/disable signal and may control the bias generator Bias Gen. The bias generator Bias Gen. may provide the varied bias to the photoreceptor on the first substrate through the signal path connected through the C2C bonding 601 or the TSV 603.

Accordingly, the photoreceptor may be placed on the second substrate while securing a light receiving area of the photoreceptor, by placing the pixel back-end circuit and the bias variation circuit on the first substrate.

Figure 14A:
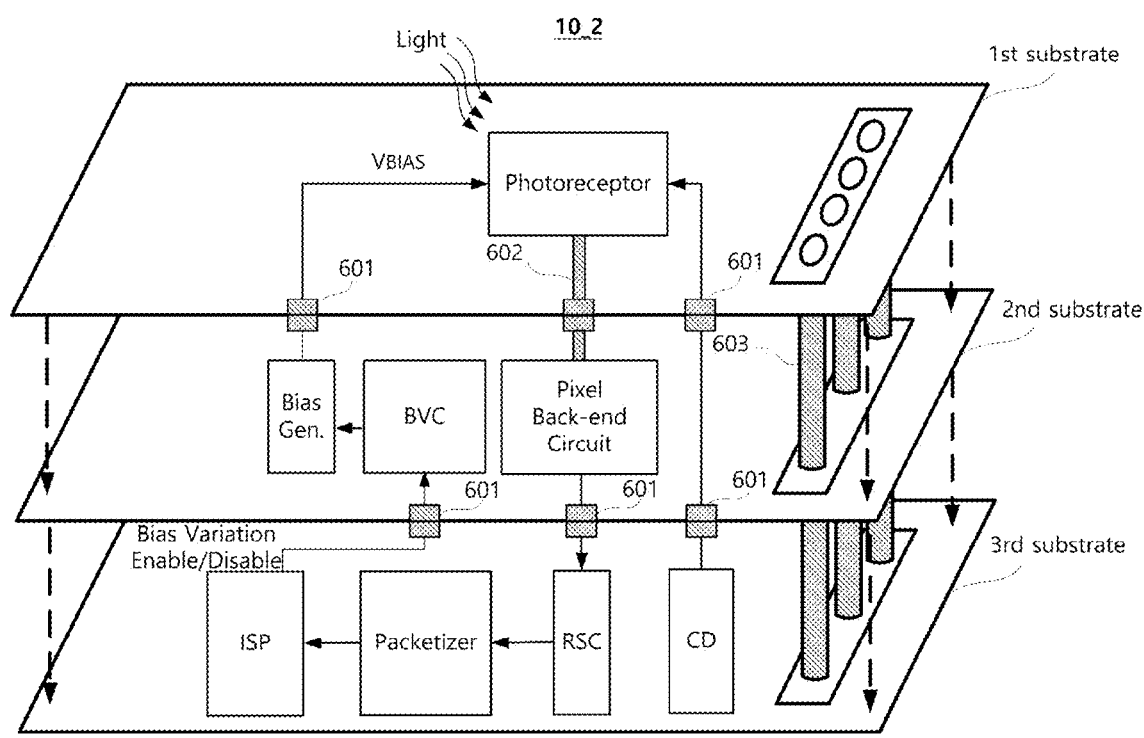
FIG. 14A to 14C are diagrams illustrating a configuration of a plurality of substrates of a dynamic vision sensor, according to some example embodiments.
Figure 14B:
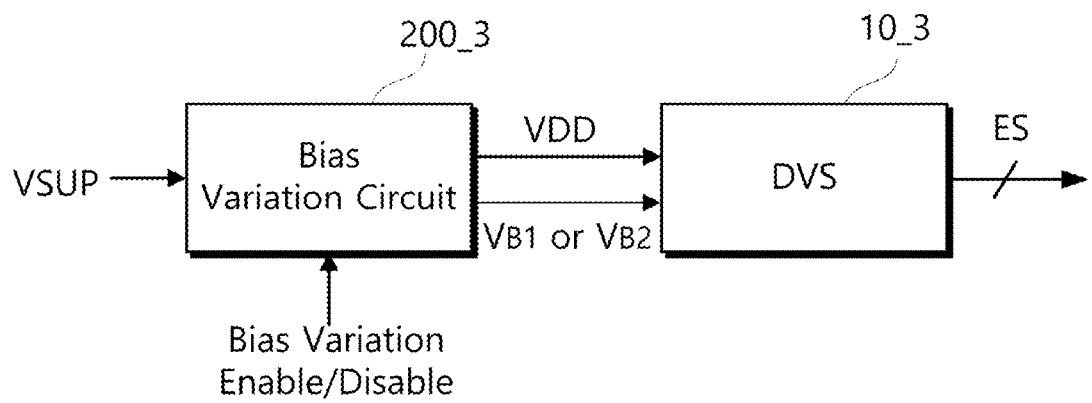
Figure 14C:
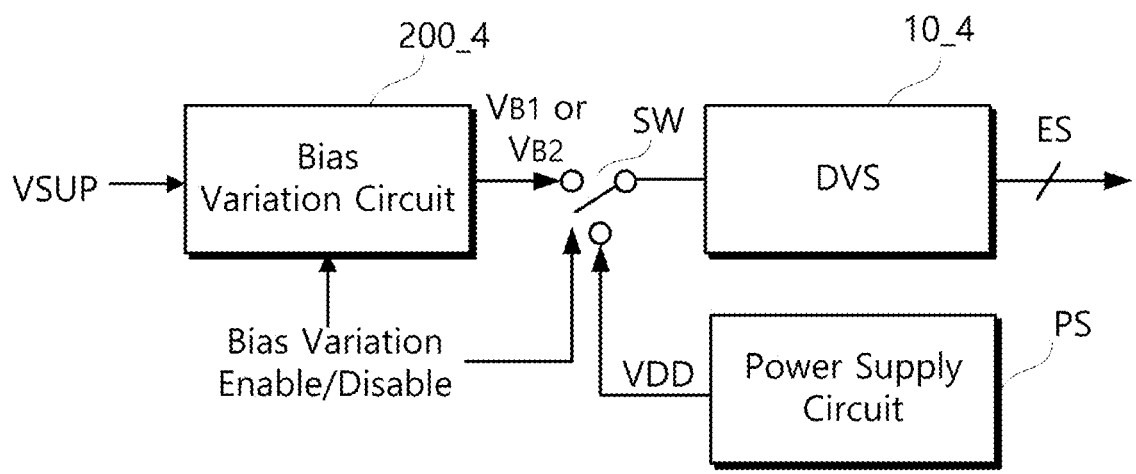

FIG. 14A to 14C are block diagrams of a dynamic vision sensor, according to some example embodiments. Detailed descriptions of parts identical or similar to those described above with reference to FIG. 13 will be omitted to avoid redundancy.

In an example embodiment, referring FIG. 14A, a dynamic vision sensor 10_2 may be a stacked dynamic vision sensor including a plurality of vertically stacked substrates electrically connected to each other in a single chip package.

A photoreceptor may be positioned on a first substrate among the plurality of substrates, and at least part of a pixel back-end circuit may be positioned on a second substrate electrically connected to the first substrate. The pixel back-end circuit may include a voltage buffer. The voltage buffer may be the voltage buffer circuit 150 described with reference to FIG. 6. The row sampling circuit RSC, the column driver CD and the packetizer may be placed on a third substrate. The bias variation controller BVC and the bias generator Bias Gen. may be positioned on the second substrate.

Among the stacked substrates, the photoreceptor on the first substrate and the pixel back-end circuit on the second substrate may be electrically connected to each other through an in-pixel interconnector 602. For example, the photoreceptor on the first substrate and the voltage buffer of the pixel back-end circuit on the second substrate may be electrically connected through in-pixel C2C bonding or in-pixel TSV. The pixel back-end circuit may be connected through a signal path connected to the row sampling circuit RSC on the third substrate through the C2C bonding 601 or the TSV 603.

The column driver CD on the third substrate may transmit a selection signal to the photoreceptor on the first substrate through a signal path connected through the C2C bonding 601 or a signal path connected through the TSV 603. The column bias variation controller BVC on the second substrate may receive a bias variation enable/disable signal from an image signal processor ISP on the third substrate and may control the bias generator Bias Gen. The bias generator Bias Gen may provide the varied bias to the photoreceptor on the first substrate through the signal path connected through the C2C bonding 601 or the TSV 603.

Accordingly, the image signal processor and the dynamic vision sensor 10_2 may be provided as one sensor.

The image signal processor ISP on the third substrate may reduce the noise of the event signal included in the packet or may correct the packet. For example, the image signal processor ISP may correct an event data packet based on a response time according to the address and illuminance value of a pixel where the ON-event occurs.

The image signal processor ISP according to some example embodiments may generate a gray-level image by using an event signal based on varied bias. A method in which the image signal processor ISP generates a gray-level image by using an event signal based on the varied bias will be described with reference to FIGS. 18 and 19 below.

In an example embodiment, referring FIG. 14B, a dynamic vision sensor 10_3 may receive a power supply voltage VDD and a power supply voltage bias from a bias variation circuit 200_3. The power supply voltage bias may be one of a power supply voltage bias VB1 or a power supply voltage bias VB2. The bias variation circuit 200_3 may regulate a power supply voltage VSUP and generate the power supply voltage VDD and the power supply voltage bias. The bias variation circuit 200_3 may provide one of the power supply voltage VDD or the power supply voltage bias based on a bias variation enable signal and a bias variation disable signal. The bias variation circuit 200_3 may be located outside of the dynamic vision sensor 10_3. The bias variation circuit 200_3 may be located in a different chip package from a chip package in which the dynamic vision sensor 10_3 is located.

In an example embodiment, referring FIG. 14C, a dynamic vision sensor 10_3 may receive a power supply voltage VDD from a power supply circuit PS and receive a power supply voltage bias from a bias variation circuit 200_4. The power supply voltage bias may be one of a power supply voltage bias VB1 or a power supply voltage bias VB2. A switch SW may select the power supply voltage VDD or the power supply voltage bias based on a bias variation enable signal and a bias variation disable signal. The bias variation circuit 200_3 and the power supply circuit PS may be located outside of the dynamic vision sensor 10_4.

Figure 15:
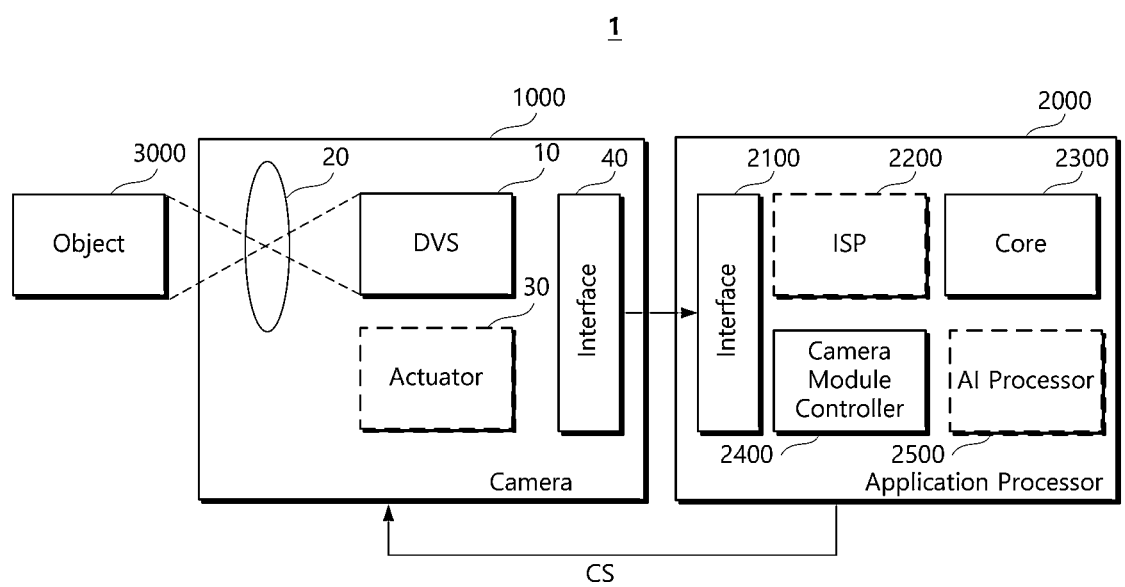
FIG. 15 is a block diagram illustrating a dynamic vision sensor and a processor, according to some example embodiments.
Figure 16:
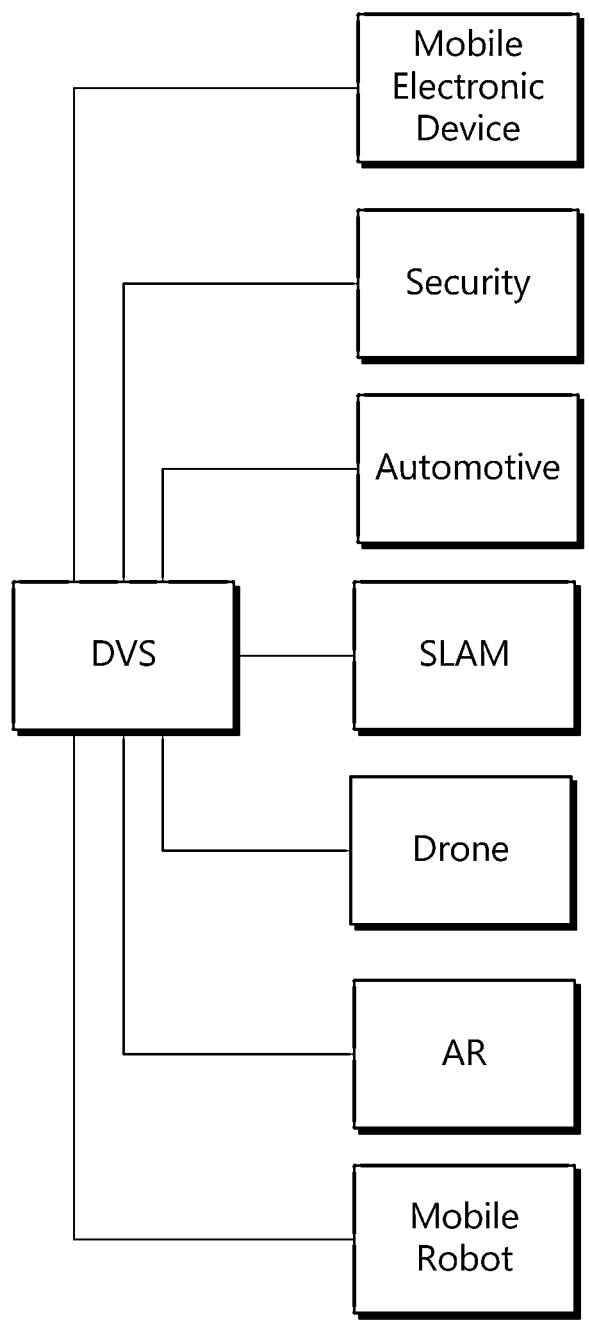
FIG. 16 is a diagram illustrating various examples of electronic devices, to which a dynamic vision sensor and a processor are applied, according to some example embodiments.

FIG. 15 is a block diagram of an image processing system 1, according to some example embodiments. The image processing system 1 may include a camera 1000 and an application processor 2000. Referring to FIG. 16, the image processing system 1 may be applied to a portable electronic device, such as a digital camera, a camcorder, a mobile phone, a smart phone, a tablet personal computer (PC), a personal digital assistant (PDA), a wearable computer, or an Internet of things (IoT) device. Furthermore, the image processing system 1 may be applied to simultaneous localization and mapping (SLAM) devices such as autonomous vehicles, ADAS, drones, security devices such as security cameras, and mobile robots.

The camera 1000 may include the dynamic vision sensor 10, a lens 20, an actuator 30, and an input/output interface 40. The actuator 30 may not be optionally included according to an embodiment. Optionally, the camera 1000 may include an RGB image sensor. The RGB image sensor may be a CMOS image sensor (CIS).

Under the control of the application processor 2000, the dynamic vision sensor 10 may sense an object 3000 captured through the lens 20. The dynamic vision sensor 10 may generate an event signal based on a change in the intensity of an optical signal of an object 3000 incident through the lens 20. The event signal may be packetized and output.

The dynamic vision sensor 10 may be connected to an external device such as the application processor 2000 through the input/output interface 40 in I2C or MIPI method. The dynamic vision sensor 10 may transmit a packet to the application processor 2000 through the input/output interface 40 or may receive a control signal CS from the application processor 2000.

The application processor 2000 may receive an event signal through an interface 2100, and an image signal processor 2200 may process the event signal. For example, the image signal processor 2200 may reduce the noise of the event signal or may correct the packet. For example, the image signal processor 2200 may correct an event data packet based on a response time according to the address and illuminance value of a pixel where the ON-event occurs. Optionally, the application processor 2000 may not include the image signal processor 2200. In this case, noise processing of the event signal and correction of the packet may be made in a core processor 2300.

The image signal processor 2200 may generate an event image based on the event signal. The event image may be an image obtained by setting an ON-event occurring at the same time to each pixel value.

The core processor 2300 operates an application program. For example, the application program may be used to detect an object from the event signal. According to embodiments, some operations of the core processor 2300 may be performed by an AI processor 2500 (e.g., GPU, GPGPU, an AI-dedicated processor, a parallel processing processor, or the like) electrically connected to the core processor 2300.

The dynamic vision sensor 10 according to some example embodiments may include a photoreceptor and a bias variation circuit of embodiments described with reference to FIGS. 1 to 14.

Even when there is no change in the intensity of an optical signal of the object 3000, the dynamic vision sensor 10 according to some example embodiments may output an event signal based on the varied bias provided by the bias variation circuit. An operating mode in which the dynamic vision sensor 10 outputs an event signal based on the varied bias provided by the bias variation circuit may be referred to as a "bias variation mode". The dynamic vision sensor 10 may operate in the bias variation mode in response to the bias variation enable signal received from the application processor 2000. The bias variation enable signal may be transmitted while being included in the control signal CS.

The dynamic vision sensor 10 may operate in a normal mode, in which an event signal is output based on a change in intensity of the optical signal of the object 3000, and may operate in the bias variation mode in response to the bias variation enable signal received from the application processor 2000. The dynamic vision sensor 10 may operate in the normal mode again in response to the bias variation disable signal received from the application processor 2000.

The application processor 2000 may control the dynamic vision sensor 10 such that a mode of the dynamic vision sensor 10 is switched between the normal mode and the bias variation mode according to an embodiment of the application program. For example, the ADAS of a vehicle may detect an object based on the event signal output by the dynamic vision sensor 10 of a front camera in the normal mode. When an object is not detected based on the event signal output in the normal mode (e.g., when a front vehicle is driving at the same speed as an ego vehicle), the application processor 2000 may send the bias variation enable signal to the camera 1000 to switch the mode of the dynamic vision sensor 10 to a variable mode.

The image signal processor 2200 or the core processor 2300 of the application processor 2000 may generate a gray-level image based on the event signal of the bias variation mode. The image signal processor 2200 or the core processor 2300 may identify the event signal of the bias variation mode based on a header of the packet (referred to as "event data"). The header may be information bits added by a packetizer of the dynamic vision sensor in response to the bias variation ON signal or the bias variation OFF signal.

The image signal processor 2200 or the core processor 2300 may detect an object based on a gray-level image. An algorithm for detecting an object based on an event signal in the normal mode may be different from an algorithm for detecting an object based on a gray-level image.

Figure 17:
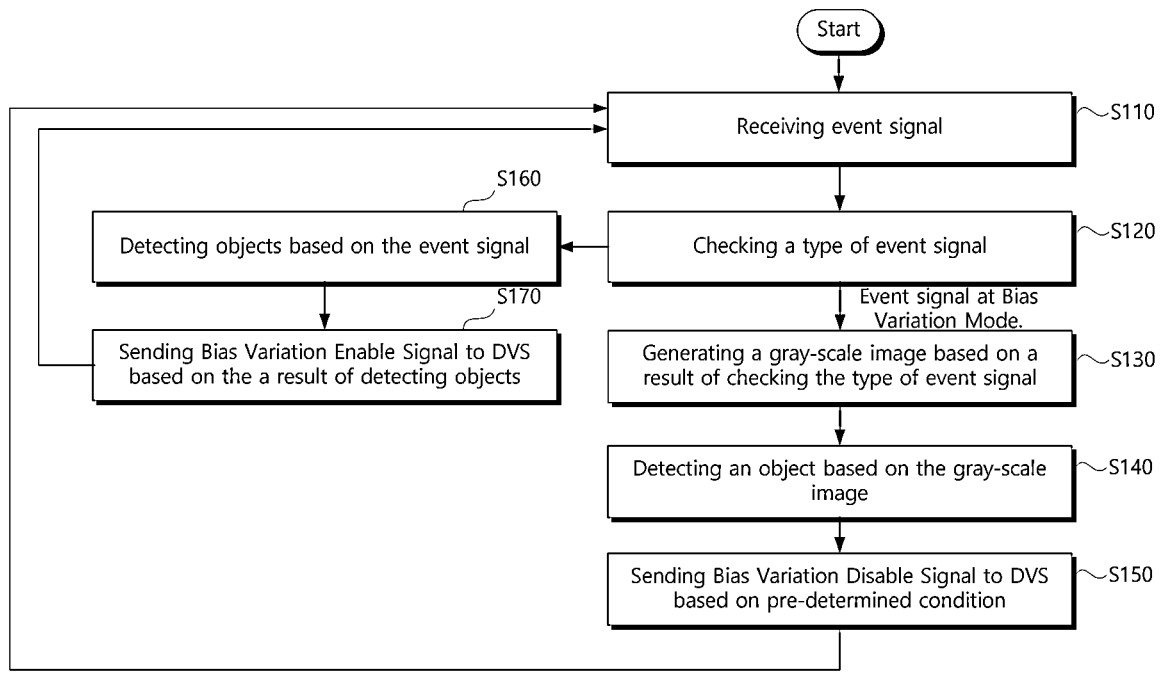
FIG. 17 is a flowchart for describing a method, in which a processor generates a gray-level image, according to some example embodiments.

FIG. 17 is a flowchart for describing an operation in which the application processor 2000 of the image processing system 1 according to an embodiment of FIG. 15 of the present disclosure generates a gray-level image and detects an object based on the gray-level image. The image signal processor 2200 of the application processor 2000 may generate a gray-level image based on event data.

The core processor 2300 may detect an object by performing an object detection algorithm based on the gray-level image.

The core processor 2300 may detect an object based on an event signal generated by the dynamic vision sensor in a normal mode.

In operation S110, the application processor 2000 may receive event data from the dynamic vision sensor 10 of the camera 1000.

In operation S120, the application processor 2000 may check a header of the event data received from the dynamic vision sensor. The application processor 2000 may determine whether the event data is event data generated in a bias variation mode or event data generated in the normal mode, based on predetermined information bits. The application processor 2000 may apply a conventional event signal processing method to the event data generated in the normal mode.

In operation S130, the application processor 2000 may generate the gray-level image based on the event signal included in the event data generated in the bias variation mode.

Figure 18:
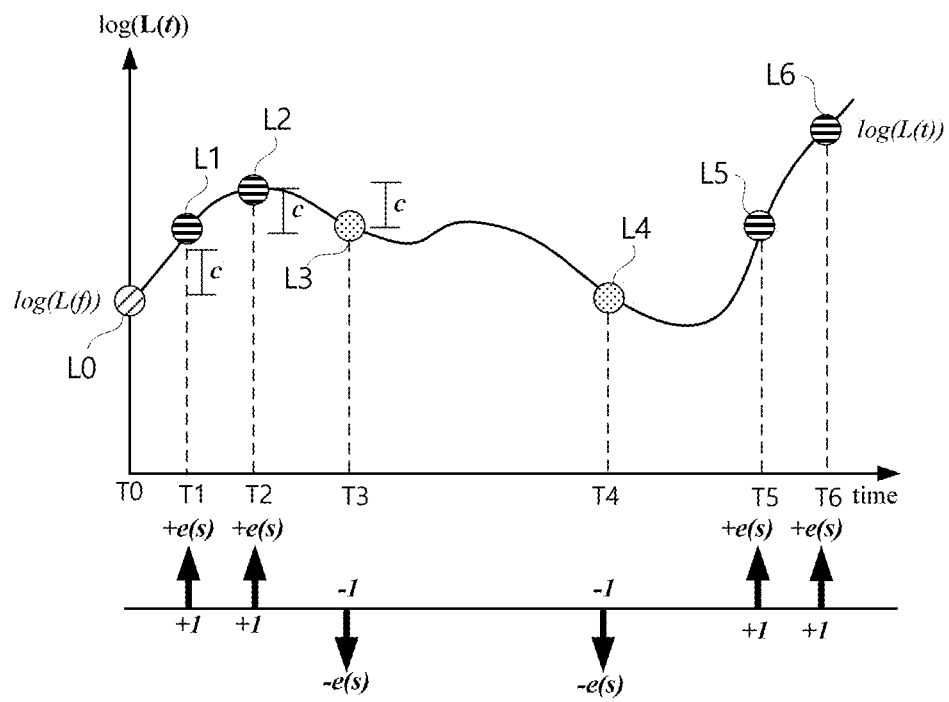
FIG. 18 is a diagram for describing a method, in which a processor generates a gray-level image, according to some example embodiments.

Referring to FIG. 18, the application processor 2000 generates a reference frame image in response to receiving a first event signal L0. For example, a reference frame image may be a frame image in which all image pixel values are set to the same grayscale level (e.g., when a gray-level image of level 256 is generated, each pixel value may be set to 128).

The application processor 2000 may generate a gray-level image by reflecting event signals L1 to L6 received after the first event signal L0 to individual pixel values of the reference frame image. For example, a gray-level image based on the event signal L6 may be an image obtained by accumulating and reflecting the event signals L1 to L5 and the event signal L6, which are previously received, to individual pixel values of the reference frame image.

A method in which the application processor 2000 reflects the event signals L1 to L6 to individual pixel values of the reference frame image will be described.

In the dynamic vision sensor, the event signal L1 generated at time TI includes relative information about the event signal L0 generated at time TO. For example, when the event signal L1 is an ON-event signal, the intensity of incident light contributing to the event signal L1 is greater than the intensity of incident light contributing to the event signal L0. Accordingly, a logarithmic scale voltage of a pixel of the dynamic vision sensor corresponding to the event signal L1 is greater than a logarithmic scale voltage of the pixel of the dynamic vision sensor corresponding to the event signal L0. Moreover, when the event signal L3 is an OFF-event signal, the intensity of incident light contributing to the event signal L3 is smaller than the intensity of incident light contributing to the event signal L2. Accordingly, a logarithmic scale voltage of the pixel of the dynamic vision sensor corresponding to the event signal L3 is smaller than a logarithmic scale voltage of the pixel of the dynamic vision sensor corresponding to the event signal L2.

Accordingly, a logarithmic scale voltage of a pixel of the dynamic vision sensor 10 at a specific point in time (t) may be expressed based on Equation 1 below.

$$\log(L(t)) = \log(L(f)) + c \cdot \{e_f + e_{f+1} + e_{f+2} + \ldots + e_t\} \quad \text{[Equation 1]}$$

L(t) denotes the illuminance of incident light. 'c' denotes a logarithmic scale voltage difference between neighboring event signals. L(f) denotes the illuminance of incident light corresponding to a reference frame image. $e_k$ denotes an event signal at a point in time 'k'.

Equation 1 may be summarized as the following Equation 2.

$$\begin{aligned} L(t) &= L(f) \cdot e^{c \cdot \{e_f + e_{f+1} + e_{f+2} + \ldots + e_t\}} \quad \text{[Equation 2]} \\ &= L(f) \cdot (e^c)^{\{e_f + e_{f+1} + e_{f+2} + \ldots + e_t\}} \\ &= L(f) \cdot (e^c)^{\{(+1)+(+1)+(-1)+\ldots+(+1)\}} \\ &= L(f) \cdot \{(e^c) \times (e^c) \div (e^c) \div (e^c) \times (e^c) \times (e^c)\} \end{aligned}$$

Equation 2 shows that the illuminance of incident light of a pixel of the dynamic vision sensor 10 at a specific point in time (t) may be generated based on event signals at a previous point in time.

Accordingly, the application processor 2000 may identify event types (polarities) of the event signals L1 to L6 received after the first event signal L0 and may change individual pixel values of the reference frame image according to the event types. In other words, a pixel value may be changed by multiplying a pixel value of the previous frame image by $e^c$ when the ON-event occurs, and by dividing a pixel value of the previous frame image by $e^c$ when an OFF-event occurs.

Accordingly, each pixel value in the gray-level image is not the exact absolute illuminance value of incident light contributing to the event signal. However, the relative illuminance difference between incident lights incident on each pixel of the dynamic vision sensor 10 at the same time may be reflected.

In operation S140, the application processor 2000 may detect an object by applying an object detection algorithm to a gray-level image generated based on an event signal.

In operation S150, when predetermined conditions are satisfied, the application processor 2000 may send a bias variation disable signal to the dynamic vision sensor 10. For example, when a specific time has passed since the bias variation enable signal was sent, the application processor 2000 may send the bias variation disable signal.

When the header of the event data checked in operation S120 indicates event data in a normal mode, the application processor 2000 performs operation S160.

In operation S160, the application processor 2000 may detect an object based on an event signal in the normal mode.

In operation S170, when an object is not detected, the application processor 2000 may send a bias variation enable signal to the dynamic vision sensor 10.

FIG. 19 is a flowchart for describing an operation in which the application processor 2000 of the image processing system 1 according to an embodiment of FIG. 15 of the present disclosure generates a gray-level image and performs auto-focusing based on the gray-level image. The image signal processor 2200 of the application processor 2000 may generate a gray-level image based on event data. The core processor 2300 may perform an auto-focusing algorithm based on the gray-level image. Detailed descriptions of parts identical or similar to those described above with reference to FIGS. 17 and 18 will be omitted to avoid redundancy.

In operation S210, the application processor 2000 starts an auto-focusing mode. The application processor 2200 may send the bias variation enable signal to the dynamic vision sensor 10.

In operation S220, the image signal processor 2200 may perform auto-focusing of the camera 1000 based on the contrast of the gray-level image.

For example, the core processor 2300 may send the control signal CS of the actuator 30 to the camera 1000. The core processor 2300 may receive first event data and second event data, which are generated at different locations of the lens 20. The first event data and the second event data are pieces of event data generated in a bias variation mode.

The image signal processor 2200 may generate a first gray-level image and a second gray-level image based on the first event data and the second event data, respectively. The image signal processor 2200 may generate a gray-level image according to the method described with reference to FIG. 18.

The image signal processor 2200 may measure the contrast of a specific portion of an image between at least some areas of the first gray-level image and the second gray-level image.

In operation S230, when the contrast between the first gray-level image and the second gray-level image is enlarged, e.g., is increased to be maximized or close to maximized, the image signal processor 2200 may stop auto-focusing. The application processor 2200 may send the bias variation disable signal to the dynamic vision sensor 10.

In the meantime, the above description refers to detailed embodiments for carrying out the present disclosure. Embodiments in which a design is changed simply or which are easily changed may be included as well as example embodiments described above. In addition, technologies that are easily changed and implemented by using the above embodiments may be included herein. While inventive concepts have been described with reference to embodiments described above, it will be apparent to those of ordinary skill in the art that various changes and modifications may be made thereto without departing from the spirit and scope of example embodiments as set forth in the following claims.

An image sensor according to some example embodiments may generate an event signal even when the intensity of incident light does not change.

Any of the elements and/or functional blocks disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

A processor according to some example embodiments may generate a gray-level image based on an event signal.

While the present disclosure has been described with reference to embodiments thereof, it will be apparent to those of ordinary skill in the art that various changes and modifications may be made thereto without departing from the spirit and scope of the present disclosure as set forth in the following claims. Additionally, example embodiments are not necessary mutually exclusive. For example, some example embodiments may include one or more features described with reference to one or more figures, and may also include one or more other features described with reference to one or more other figures.

What is claimed is:

1. A dynamic vision sensor (DVS) comprising:
    a photodiode configured to generate a first photodiode current in response to a change in light due to a movement of an object;
    a first transistor;
    a first node connected to the photodiode and the first transistor;
    a second node connected to the first transistor and being configured to receive a first voltage and receive a second voltage;
    a ground;
    a second transistor connected to the first node and the ground;
    a third node connected to the first transistor and the second transistor; and
    a current source connected to the third node,
        wherein the first voltage has a first level and the second voltage has a second level different from the first level.

2. The dynamic vision sensor of claim 1, wherein the third node is connected to a gate of the first transistor, and
    wherein the first node is connected to a gate of the second transistor.

3. The dynamic vision sensor of claim 2, wherein the photodiode is configured to generate a second photodiode current in response to the first voltage.

4. The dynamic vision sensor of claim 3, wherein the photodiode is configured to generate a third photodiode current in response to the second voltage.

5. The dynamic vision sensor of claim 3, wherein the second node is configured to receive a third voltage, and
    wherein the third voltage has a third level different from at least one of the first level and the second level.

6. The dynamic vision sensor of claim 3, wherein the second node is configured to receive the first voltage and the second voltage alternately.

7. The dynamic vision sensor of claim 3, wherein the second node is configured to receive the first voltage from a bias variation circuit located in a first chip package different from a second chip package in which the photodiode is located.

8. The dynamic vision sensor of claim 3, wherein the second node is configured to receive the first voltage from a bias variation circuit, and
    wherein the bias variation circuit and the photodiode are located in a single chip package.

9. The dynamic vision sensor of claim 8, wherein the current source is configured to receive a fourth voltage from the bias variation circuit.

10. The dynamic vision sensor of claim 9, wherein the current source is configured to receive a fifth voltage from the bias variation circuit.

11. The dynamic vision sensor of claim 8, wherein the bias variation circuit is configured to supply the first and second voltage to the second node based on a bias variation enable signal.

12. The dynamic vision sensor of claim 8, wherein the bias variation circuit is configured not to supply the first voltage and second voltage to the second node based on a bias variation disable signal.

13. A dynamic vision sensor (DVS) comprising:
    a photodiode configured to generate a first photodiode current in response to a change in light due to a movement of an object;
    a first transistor;
    a first node connected to the photodiode and the first transistor;
    a second node connected to the first transistor;
    a ground;
    a second transistor connected to the first node and the ground;
    a third node connected to the first transistor and the second transistor; and
    a current source connected to the third node and configured to receive a first voltage and a second voltage,
        wherein the first voltage has a first level and the second voltage has a second level different from the first level.

14. The dynamic vision sensor of claim 13, wherein the third node is connected to a gate of the first transistor, and
    wherein the first node is connected to a gate of the second transistor.

15. The dynamic vision sensor of claim 14, wherein the photodiode configured to generate a second photodiode current in response to the first voltage.

16. The dynamic vision sensor of claim 15, wherein the photodiode is configured to generate a third photodiode current in response to the second voltage.

17. The dynamic vision sensor of claim 15, wherein the current source is configured to receive a third voltage having a third level different from at least one of the first level and second level.

18. The dynamic vision sensor of claim 15, wherein the current source is configured to receive the first voltage and the second voltage alternately.

19. The dynamic vision sensor of claim 15, wherein the second node is configured to receive the first voltage from a bias variation circuit located in a first chip package different from a second chip package in which the photodiode is located.

20. The dynamic vision sensor of claim 15, wherein the second node is configured to receive the first voltage from a bias variation circuit, and
  wherein the bias variation circuit and the photodiode are located in a single chip package.

* * * * *